United States Patent
Zhang et al.

(10) Patent No.: US 12,231,186 B2
(45) Date of Patent: Feb. 18, 2025

(54) METHOD AND APPARATUS FOR GENERATING PHYSICAL NETWORK TOPOLOGY

(71) Applicant: Huawei Technologies Co., Ltd., Shenzhen (CN)

(72) Inventors: Xiquan Zhang, Dongguan (CN); Xianyin Li, Shenzhen (CN); Jiahong Wei, Shenzhen (CN); Yu Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 548 days.

(21) Appl. No.: 17/695,499

(22) Filed: Mar. 15, 2022

(65) Prior Publication Data
US 2022/0209823 A1    Jun. 30, 2022

Related U.S. Application Data

(63) Continuation of application No. PCT/CN2020/115942, filed on Sep. 17, 2020.

(30) Foreign Application Priority Data

Sep. 17, 2019 (CN) .......................... 201910875391.4

(51) Int. Cl.
*H04B 3/54* (2006.01)
*H02J 3/00* (2006.01)

(52) U.S. Cl.
CPC ............. *H04B 3/546* (2013.01); *H02J 3/007* (2020.01); *H04B 3/544* (2013.01); *H02J 2203/10* (2020.01)

(58) Field of Classification Search
CPC ......... H04B 3/546; H04B 3/544; H02J 3/007; H02J 2203/10; G06F 30/18
See application file for complete search history.

(56) References Cited

U.S. PATENT DOCUMENTS

| | | | |
|---|---|---|---|
| 6,426,947 B1 * | 7/2002 | Banker | ............... H04L 41/0213 370/254 |
| 2011/0122798 A1 | 5/2011 | Hughes et al. | |
| 2014/0085105 A1 | 3/2014 | Vaswani et al. | |
| 2014/0213858 A1 | 7/2014 | Presura et al. | |

(Continued)

FOREIGN PATENT DOCUMENTS

| CN | 103684842 A | 3/2014 |
|---|---|---|
| CN | 103781414 A | 5/2014 |

(Continued)

*Primary Examiner* — Manuel A Rivera Vargas
(74) *Attorney, Agent, or Firm* — Conley Rose, P.C.

(57) ABSTRACT

A method includes a gateway node that obtains a data transmission parameter between a first-level node and each node in a first node set, where the first-level node is located on a first-level power distribution device in a power distribution grid, and the first node set includes a node located on a power distribution device at another level in the power distribution grid other than the first-level power distribution device; determines a second-level node directly coupled to the first-level node from the first node set based on the data transmission parameter between the first-level node and each node in the first node set; and generates a physical network topology of the power distribution grid.

20 Claims, 16 Drawing Sheets

(56) References Cited

U.S. PATENT DOCUMENTS

| | | | |
|---|---|---|---|
| 2015/0253367 A1* | 9/2015 | Flammer, III | H04L 67/51 |
| | | | 324/76.77 |
| 2016/0097796 A1 | 4/2016 | Flammer, III | |
| 2016/0154040 A1* | 6/2016 | Driscoll | G01D 4/002 |
| | | | 324/76.77 |

FOREIGN PATENT DOCUMENTS

| | | |
|---|---|---|
| CN | 103957032 A | 7/2014 |
| CN | 203911593 U | 10/2014 |
| CN | 104781861 A | 7/2015 |
| CN | 109525285 A | 3/2019 |

\* cited by examiner

| Destination identifier field | Source identifier field | Measurement sequence field | Transmit timestamp count value field | Receive timestamp count value field |
|---|---|---|---|---|
| | | | | |

METHOD AND APPARATUS FOR GENERATING PHYSICAL NETWORK TOPOLOGY

CROSS-REFERENCE TO RELATED APPLICATIONS

This is a continuation of International Patent Application No. PCT/CN2020/115942 filed on Sep. 17, 2020, which claims priority to Chinese Patent Application No. 201910875391.4 filed on Sep. 17, 2019. The disclosures of the aforementioned applications are hereby incorporated by reference in their entireties.

TECHNICAL FIELD

This application relates to the communications field, and in particular, to a method and an apparatus for generating a physical network topology.

BACKGROUND

A power distribution grid is a power grid that distributes electric energy in a power transmission grid to users. The power distribution grid may include first-level power distribution cabinets, second-level power distribution cabinets, ..., and $M^{th}$-level power distribution cabinets, where M is an integer greater than or equal to 2. There is only one first-level power distribution cabinet, and there may be one or more power distribution cabinets at each of other levels. An input end of an $i^{th}$-level power distribution cabinet is connected to an output end of an $(i-1)^{th}$-level power distribution cabinet, where i=2, 3, ..., M. An output end of the $M^{th}$-level power distribution cabinet is connected to a power-consuming device, and an input end of the first-level power distribution cabinet is connected to the power transmission grid through a transformer. After a power distribution grid is established, a visual physical network topology needs to be generated. The physical network topology includes a connection relationship between power distribution cabinets in the power distribution grid, so that an administrator can effectively manage the power distribution grid based on the physical network topology.

The physical network topology of the power distribution grid is generated in the following two manners.

Manner 1: The power distribution grid is established based on a planned design drawing. Therefore, technical support personnel can enter basic information of each power distribution cabinet into computer software based on the drawing. The basic information of the power distribution cabinet includes a number and a position of the power distribution cabinet, a number of a power distribution cabinet connected to an input end of the power distribution cabinet, and a number of a power distribution cabinet connected to an output end of the power distribution cabinet. In this way, the computer software generates the physical network topology of the power distribution grid based on the basic information of each power distribution cabinet.

Manner 2: A signal transmitting unit is disposed at an input end of each power distribution cabinet in the $M^{th}$-level power distribution cabinets, and a signal detection unit is disposed at an output end of a power distribution cabinet at each of other levels. Each signal transmitting unit sends a feature current signal to the first-level power distribution cabinet in the power distribution grid. The feature current signal is transmitted along a branch from a power distribution cabinet connected to the signal transmitting unit to the first-level power distribution cabinet. Then, the signal transmitting unit sends, to a central processing unit (CPU), a characteristic quantity corresponding to the feature current signal and basic information of the power distribution cabinet connected to the signal transmitting unit. The basic information includes an identifier, a position, and the like of the power distribution cabinet. Feature current signals transmitted by signal transmitting units correspond to different characteristic quantities. The CPU receives the characteristic quantity and the basic information, and stores the characteristic quantity and the basic information in a correspondence between a characteristic quantity and basic information. Each signal detection unit located on the branch amplifies a feature current signal when detecting the feature current signal, and sends an amplified feature current signal to the first-level distribution cabinet, and sends, to the CPU, a characteristic quantity corresponding to the detected feature current signal and basic information of a power distribution cabinet connected to the signal detection unit. The CPU receives the characteristic quantity and the basic information, and stores the characteristic quantity and the basic information in the correspondence between a characteristic quantity and basic information. The CPU may obtain, from the correspondence between a characteristic quantity and basic information, basic information of all power distribution cabinets corresponding to a same characteristic quantity, where all the power distribution cabinets corresponding to the same characteristic quantity are located on a same branch of the power distribution grid, and generate the branch based on the basic information of all the power distribution cabinets on the branch. The CPU generates another branch of the power distribution grid in the foregoing manner, to form the physical network topology of the power distribution grid.

Other approaches have at least the following problems.

In Manner 1, the basic information of the power distribution cabinet needs to be manually entered. This is inefficient and error-prone. When a physical network topology of the power distribution grid changes, the physical network topology displayed on the computer software cannot be updated in time.

In Manner 2, a circuit structure that is in the signal transmitting unit and that is used to generate the feature current signal is complex. This results in high hardware costs. In addition, the feature current signal generated by each signal transmitting unit is an artificially constructed short-circuit pulse current signal. This may easily cause a misoperation such as tripping of the power distribution cabinet in the power distribution grid, and bring a high potential safety risk.

SUMMARY

This application provides a method and an apparatus for generating a physical network topology, to improve efficiency of generating the physical network topology, reduce hardware costs, and avoid a potential security risk in a power distribution grid. The technical solutions are as follows.

According to a first aspect, this application provides a method for generating a physical network topology of a power distribution grid. In the method, a gateway node obtains a data transmission parameter between a first-level node and each node in a first node set, where the data transmission parameter includes a data transmission distance or a data transmission time, the first-level node is located on a first-level power distribution device in the power distribution grid, the first node set includes a node located on a power distribution device at another level in the power distribution grid other than the first-level power distribution device, and the node in the first node set is a child node of the first-level node. The gateway node determines a second-level node directly connected to the first-level node from the first node set based on the data transmission parameter between the first-level node and each node in the first node set. The gateway node generates the physical network topology of the power distribution grid, where the physical network topology includes a connection relationship between the first-level power distribution device on which the first-level node is located and a second-level power distribution device on which the second-level node is located.

The second-level node directly connected to the first-level node can be determined from the first node set based on the data transmission parameter between the first-level node and each node in the first node set. In other words, the physical network topology can be generated by using the data transmission parameter. The data transmission parameter includes the data transmission time or the data transmission distance, and the data transmission parameter may be obtained by using a packet between the first-level node and each node in the first node set. In this way, the gateway node, the first-level node, and the node in the first node set can obtain the data transmission parameter provided that the gateway node, the first-level node, and the node in the first node set have a function of sending and receiving a packet in the power distribution grid. Therefore, a circuit structure used to generate a feature current signal does not need to be separately disposed on each device. This can reduce costs. When the data transmission parameter is to be obtained, a packet only needs to be transmitted in the power distribution grid according to a power line communication (PLC) protocol. Therefore, a misoperation such as tripping of the power distribution device is avoided. This avoids a potential safety risk. Because the physical network topology can be automatically generated, generation efficiency can be improved. In addition, when a physical network topology of the power distribution grid changes, the physical network topology can be updated in time.

In a possible implementation, when a second target node that meets a first condition does not exist between the first-level node and a first target node, the first target node is determined as the second-level node directly connected to the first-level node. The first target node is any node in the first node set, and the second target node is a node in the first node set other than the first target node. The first condition is that a first data transmission parameter is equal to a value obtained by adding a second data transmission parameter and a third data transmission parameter, the first data transmission parameter is a data transmission parameter between the first-level node and the first target node, the second data transmission parameter is a data transmission parameter between the first-level node and the second target node, and the third data transmission parameter is a data transmission parameter between the second target node and the first target node. Because the second target node that meets the first condition does not exist between the first-level node and the first target node, it is determined that no other node exists between the first target node and the first-level node. In this way, the first target node may be determined as the second-level node directly connected to the first-level node. This improves accuracy of determining the second-level node.

In another possible implementation, the gateway node obtains a data transmission parameter between the gateway node and a node on each power distribution device in the power distribution grid, and the gateway node determines the first-level node based on the data transmission parameter between the gateway node and the node on each power distribution device in the power distribution grid. Because the data transmission parameter between the gateway node and the node on each power distribution device in the power distribution grid is obtained, the first-level node in the power distribution grid can be accurately and automatically determined based on the data transmission parameter.

In another possible implementation, when a fourth target node that meets a second condition does not exist between the gateway node and a third target node, the third target node is determined as the first-level node. The third target node is any node in nodes on all power distribution devices in the power distribution grid, and the fourth target node is a node in the nodes on all the power distribution devices in the power distribution grid other than the third target node. The second condition is that a fourth data transmission parameter is equal to a value obtained by adding a fifth data transmission parameter and a sixth data transmission parameter, the fourth data transmission parameter is a data transmission parameter between the gateway node and the third target node, the fifth data transmission parameter is a data transmission parameter between the gateway node and the fourth target node, and the sixth data transmission parameter is a data transmission parameter between the fourth target node and the third target node. If the fourth target node that meets the second condition does not exist between the gateway node and the third target node, it indicates that no other node exists between the gateway node and the third target node, and the third target node is determined as the first-level node. This improves accuracy of determining the first-level node.

In another possible implementation, the power distribution grid includes one first-level power distribution device, and the gateway node selects, from nodes on all power distribution devices in the power distribution grid, a node having a smallest data transmission parameter between the node and the gateway node as the first-level node. This improves efficiency of determining the first-level node and reduces calculation complexity.

In another possible implementation, the gateway node obtains a data transmission parameter between an $i^{th}$-level node in the first node set and a parent node of the $i^{th}$-level node, a data transmission parameter between the $i^{th}$-level node and each node in a second node set, and a data transmission parameter between the parent node and each node in the second node set, where i=2, 3, . . . , and the second node set includes a node located on a power distribution device at each level that is located after an $i^{th}$-level power distribution device, determines an $(i+1)^{th}$-level node directly connected to the $i^{th}$-level node from the second node set based on the data transmission parameter between the $i^{th}$-level node and the parent node, the data transmission parameter between the $i^{th}$-level node and each node in the second node set, and the data transmission parameter between the parent node and each node in the second node set, and generates, in the physical network topology, a connection relationship between the $i^{th}$-level power distribution device on which the $i^{th}$-level node is located and an $(i+1)^{th}$-level power distribution device on which the $(i+1)^{th}$-level node is located.

The data transmission parameter between the $i^{th}$-level node and the parent node of the $i^{th}$-level node, the data transmission parameter between the $i^{th}$-level node and each node in the second node set, and the data transmission parameter between the parent node and each node in the second node set are obtained. Therefore, the $(i+1)^{th}$-level node directly connected to the $i^{th}$-level node can be accurately determined based on the obtained data transmission parameters, and the connection relationship between the $i^{th}$-level power distribution device on which the $i^{th}$-level node is located and the $(i+1)^{th}$-level power distribution device on which the $(i+1)^{th}$-level node is located is generated in the physical network topology. In this way, the physical network topology of the entire power distribution grid can be generated by repeating this process.

In another possible implementation, a first node that meets a third condition is selected from the second node set, to obtain a child node of the $i^{th}$-level node. The third condition is that a seventh data transmission parameter is equal to a difference between an eighth data transmission parameter and a ninth data transmission parameter, the seventh data transmission parameter is a data transmission parameter between the first node and the $i^{th}$-level node, the eighth data transmission parameter is a data transmission parameter between the first node and the parent node, and the ninth data transmission parameter is a data transmission parameter between the $i^{th}$-level node and the parent node. When a sixth target node that meets a fourth condition does not exist between the $i^{th}$-level node and a fifth target node, the fifth target node is determined as the $(i+1)^{th}$-level node directly connected to the $i^{th}$-level node. The fifth target node is any child node of the $i^{th}$-level node, and the sixth target node is a node in child nodes of the $i^{th}$-level node other than the fifth target node. The fourth condition is that a tenth data transmission parameter is equal to a value obtained by adding an eleventh data transmission parameter and a twelfth data transmission parameter, the tenth data transmission parameter is a data transmission parameter between the $i^{th}$-level node and the fifth target node, the eleventh data transmission parameter is a data transmission parameter between the $i^{th}$-level node and the sixth target node, and the twelfth data transmission parameter is a data transmission parameter between the sixth target node and the fifth target node.

The third condition is that the seventh data transmission parameter is equal to the difference between the eighth data transmission parameter and the ninth data transmission parameter, and the seventh data transmission parameter is the data transmission parameter between the first node and the $i^{th}$-level node. Therefore, the child nodes of the $i^{th}$-level node can be accurately selected from the second node set based on the third condition. In this way, the $(i+1)^{th}$-level node directly connected to the $i^{th}$-level node is determined from the child nodes of the $i^{th}$-level node, so that a determining range can be reduced, and efficiency of determining the $(i+1)^{th}$-level level node can be improved.

In another possible implementation, the gateway node obtains an electrical signal feature output by a target output end of a $j^{th}$-level power distribution device, and obtains an electrical signal feature of an input end of each $(j+1)^{th}$-level power distribution device connected to the $j^{th}$-level power distribution device, where j=1, 2, ..., and the target output end is any output end of the $j^{th}$-level power distribution device. The gateway node determines, based on the electrical signal feature output by the target output end and the electrical signal feature of the input end of each $(j+1)^{th}$-level power distribution device, a $(j+1)^{th}$-level power distribution device connected to the target output end. The gateway node generates, in the physical network topology, a connection relationship between the target output end and an input end of the determined $(j+1)^{th}$-level power distribution device. In this way, the $(j+1)^{th}$-level power distribution device connected to the target output end can be automatically determined, and the connection relationship between the target output end and the input end of the determined $(j+1)^{th}$-level power distribution device is generated in the physical network topology, so that a connection relationship between power distribution devices at all levels can be more clearly displayed.

In another possible implementation, the gateway node obtains an electrical signal correlation coefficient between the target output end and the input end of each $(j+1)^{th}$-level power distribution device based on the electrical signal feature output by the target output end and the electrical signal feature of the input end of the $(j+1)^{th}$-level power distribution device. The gateway node selects a $(j+1)^{th}$-level power distribution device having a largest electrical signal correlation coefficient between the gateway node and the target output end, and determines that an input end of the selected $(j+1)^{th}$-level power distribution device is connected to the target output end. In this way, the $(j+1)^{th}$-level power distribution device connected to the target output end can be accurately determined based on the electrical signal correlation coefficient.

According to a second aspect, this application provides an apparatus for generating a physical network topology, where the apparatus is configured to perform the method in the first aspect or any one of the possible implementations of the first aspect. Further, the apparatus includes units configured to perform the foregoing method.

According to a third aspect, an embodiment of this application provides an apparatus for generating a physical network topology, where the apparatus includes a processor and a memory. The processor and the memory may be connected through a bus system. The memory is configured to store one or more computer programs, and the processor is configured to execute the one or more computer programs in the memory to complete the foregoing method.

The apparatus further includes a PLC module. The PLC module is connected to the processor.

The apparatus further includes a gateway communications module. The gateway communications module is connected to the processor, and the gateway communications module is further connected to the PLC module.

According to a fourth aspect, this application provides a computer-readable storage medium. The computer-readable storage medium stores instructions. When the instructions are run on a processor, the processor is enabled to perform the foregoing method.

According to a fifth aspect, this application provides a computer program product including instructions. When the computer program product runs on a processor, the processor is enabled to perform the foregoing method.

DESCRIPTION OF EMBODIMENTS

Figure 1:
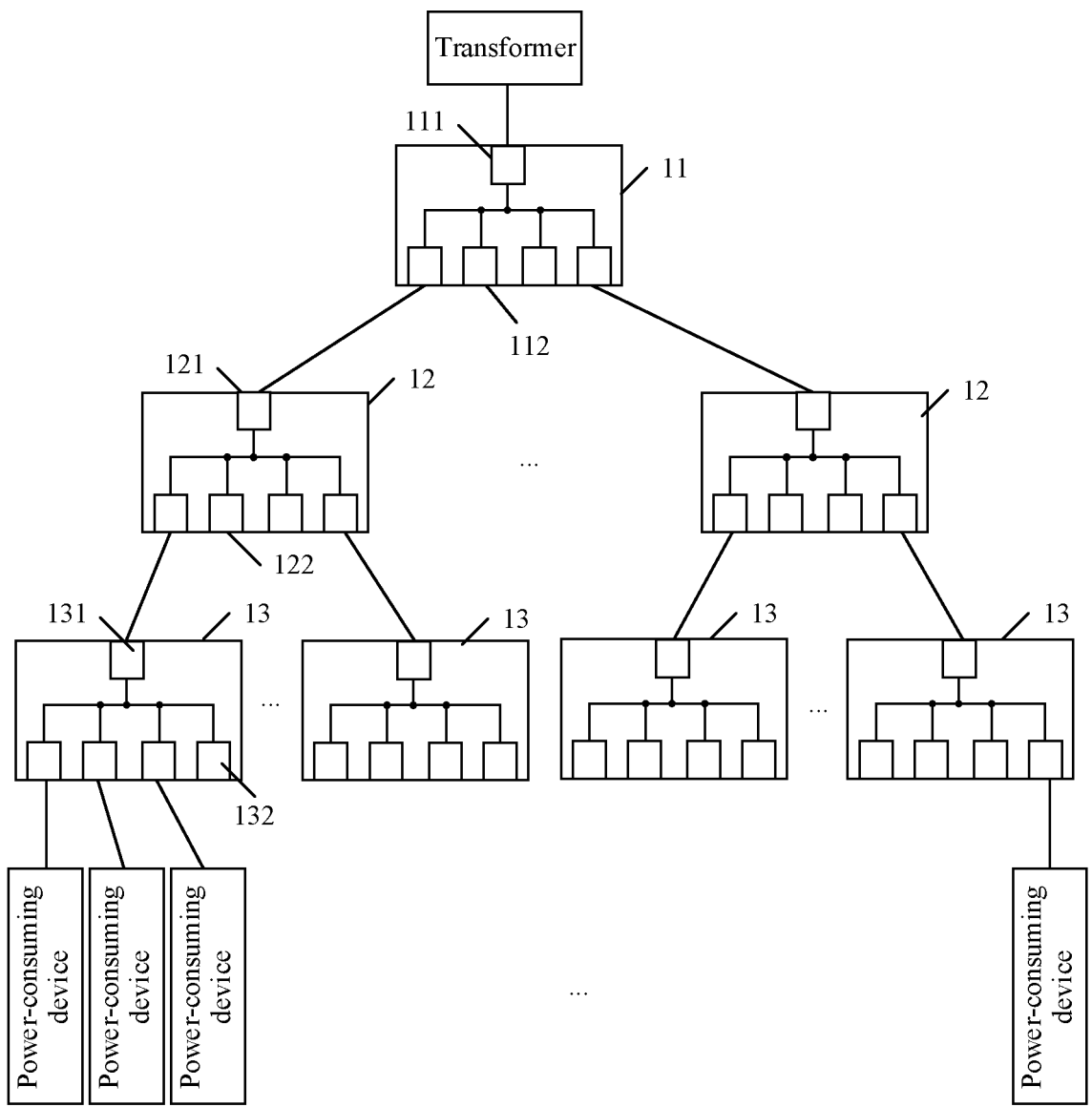
FIG. 1 is a schematic diagram of a structure of a power distribution grid according to an embodiment of this application.
Figure 2:
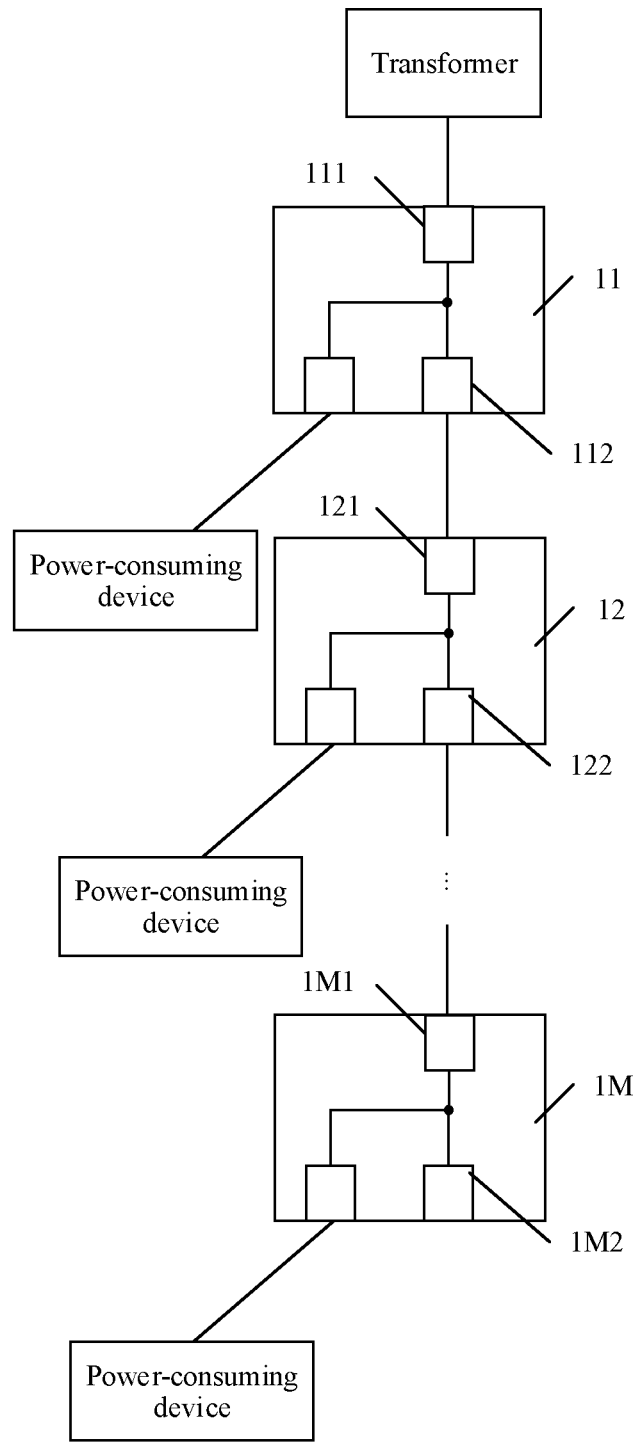
FIG. 2 is a schematic diagram of a structure of another power distribution grid according to an embodiment of this application.

Refer to FIG. 1 and FIG. 2. An embodiment of this application provides a power distribution grid. The power distribution grid includes a plurality of power distribution devices. The plurality of power distribution devices is classified into power distribution devices at M levels (in FIG. 1, M=3 is used as an example for description). A power distribution device at each level includes at least one power distribution device, and M is an integer greater than 1. For example, when M is 2, the plurality of power distribution devices includes at least one first-level power distribution device 11 and at least one second-level power distribution device 12. When M is 5, the plurality of power distribution devices includes at least one first-level power distribution device 11, at least one second-level power distribution device 12, . . . , and at least one fifth-level power distribution device 15.

An input end of an $i^{th}$-level power distribution device is connected to an output end of an $(i-1)^{th}$-level power distribution device through a power line, where i=2, 3, . . . , M. An input end of the first-level power distribution device 11 is connected to an output end of a transformer, and an input end of the transformer is connected to a mains power transmission grid.

Optionally, an output end of an $M^{th}$-level power distribution device 1M is connected to a power-consuming device. Alternatively, a part of output ends of each power distribution device in the power distribution grid are connected to a power distribution device at a lower level, and the other part of output ends are connected to a power-consuming device.

Refer to FIG. 1. The power distribution grid may be a medium- and low-voltage power distribution grid, and the power distribution device in the power distribution grid may be a power distribution cabinet, a power distribution box, or the like. An output end of each $M^{th}$-level power distribution device 1M is connected to a power-consuming device in the power distribution grid. For example, the power distribution grid may be a power distribution grid disposed in a residential community, and a structure of the power distribution grid may be shown in FIG. 1. The first-level power distribution device 11 is connected to the mains power transmission grid through the transformer. The second-level power distribution device 12 is disposed in each residential building of the residential community. An input end 121 of each second-level power distribution device 12 is connected to one input end 111 of the first-level power distribution device 11. A third-level power distribution device 13 is disposed on each floor of a residential building. An input end 131 of each third-level power distribution device 13 is connected to an output end 122 of a second-level power distribution device 12 located in the residential building. An output end 132 of each third-level power distribution device 13 may be connected to a power-consuming device in a household located in the residential building.

Refer to FIG. 2. The power distribution grid may alternatively be a street lamp network or a smart airfield ground lighting network. Each power distribution device in the power distribution grid is connected to a power-consuming device in addition to a lower-level power distribution device. The power distribution device in the power distribution grid may be a mini power distribution box, and the power distribution device usually includes a small quantity of output ends. For example, as shown in FIG. 2, the power distribution device may include two output ends, where one output end is connected to a lower-level power distribution device, and the other output end is connected to a power-consuming device.

Figure 3:
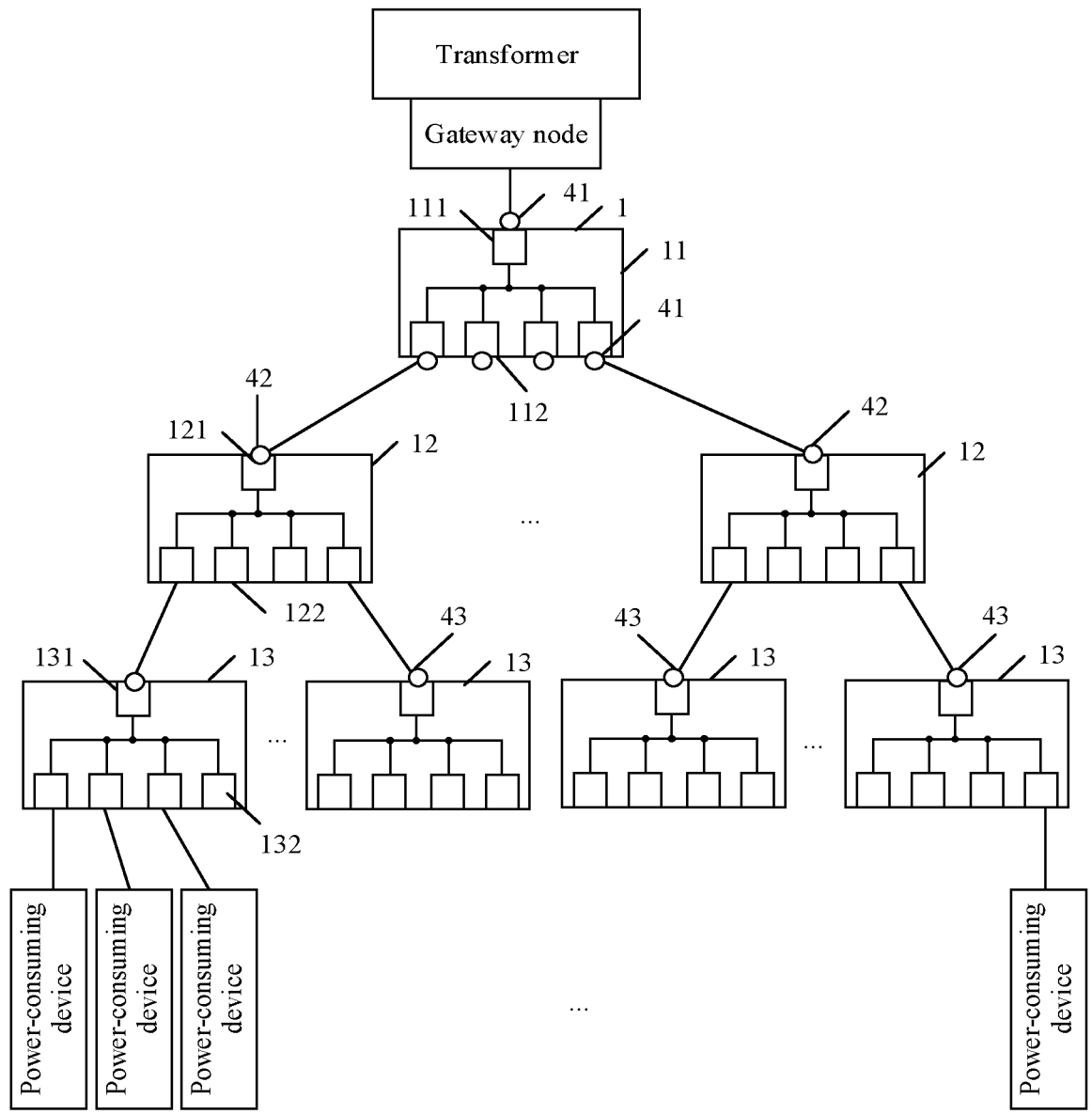
FIG. 3 is a schematic diagram of a structure of another power distribution grid according to an embodiment of this application.

To facilitate effective management of the power distribution grid by an administrator, a physical network topology of the power distribution grid may be generated. The physical network topology includes a connection relationship between power distribution devices in the power distribution grid. Refer to FIG. 3. To generate the physical network topology of the power distribution grid, a gateway node may be disposed between the transformer and the first-level power distribution device 11, and at least one node is disposed on each power distribution device.

The gateway node has a PLC function, and can implement a function such as receiving or sending a packet in the power distribution grid. The node also has a PLC communication function, and can implement a function such as receiving or sending a packet in the power distribution grid.

For any power distribution device in the power distribution grid and at least one node disposed on the power distribution device, the at least one node may be disposed at an input end and/or an output end of the power distribution device. For ease of description, a node located on the first-level power distribution device 11 is referred to as a first-level node 41, a node located on the second-level power distribution device 12 is referred to as a second-level node 42, . . . , and a node located on the $M^{th}$-level power distribution device 1M is referred to as an $M^{th}$-level node 4M (which is not shown in FIG. 3).

Figure 4:
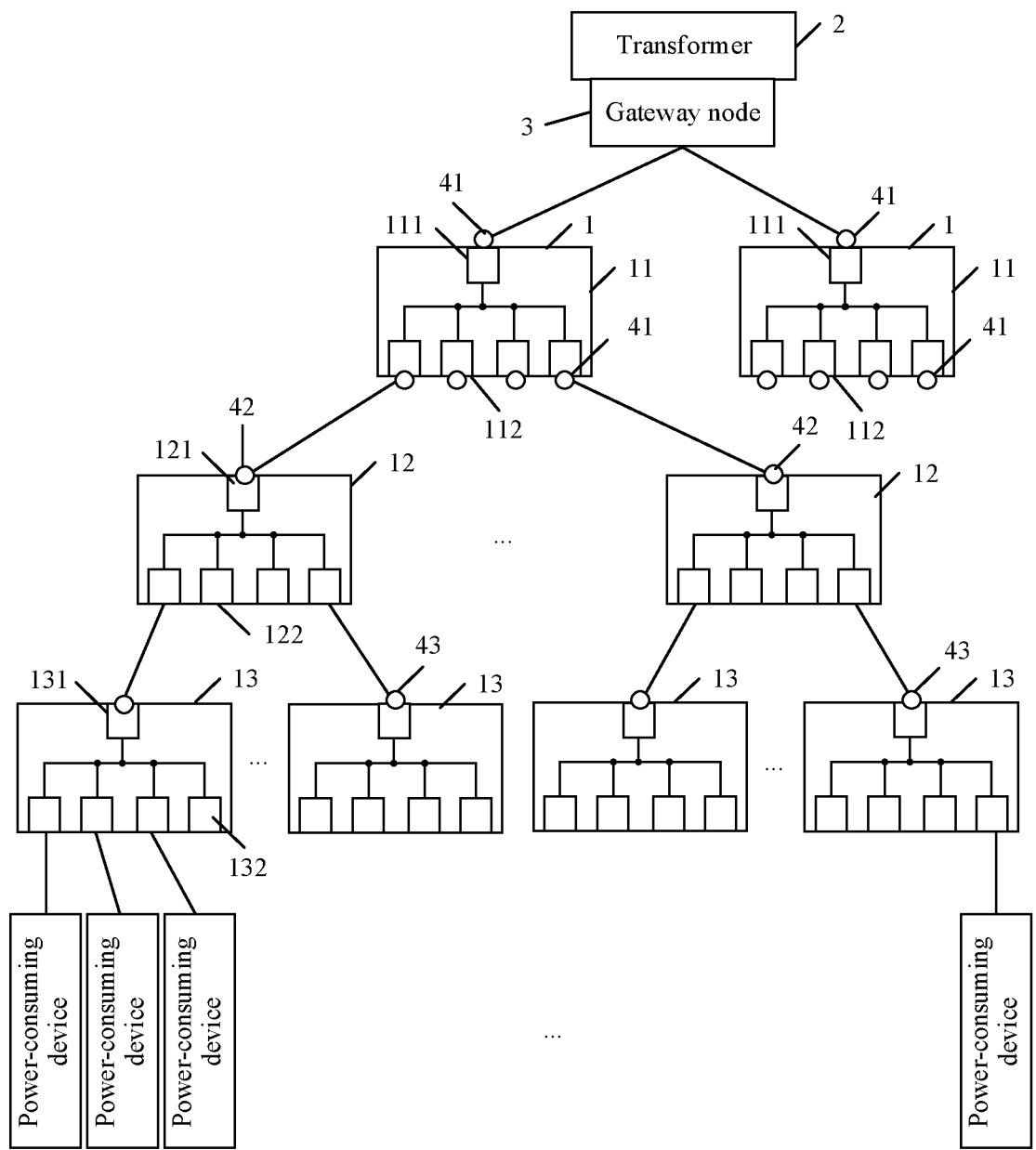
FIG. 4 is a schematic diagram of a structure of another power distribution grid according to an embodiment of this application.

Refer to FIG. 3 or FIG. 4. The gateway node may be located at the output end of the transformer. One or more nodes may be disposed on any power distribution device in the power distribution grid. When one node is disposed on the power distribution device, the node may be located at an input end or one output end of the power distribution device. When a plurality of nodes is disposed on the power distribution device, one node may be disposed at an input end of the power distribution device, and one node may be disposed at each output end of the power distribution device.

Usually, to reduce costs, one first-level node 41 is disposed at each of an input end and an output end of each first-level power distribution device 11, and one node is disposed at an input end of each power distribution device at another level.

Each node located on any power distribution device in the power distribution grid stores basic information of the power distribution device. The basic information may include at least one piece of information such as an identifier and a position of the power distribution device, and an identifier of each output end of the power distribution device.

Optionally, the identifier of the power distribution device may be a number of the power distribution device, or the like.

Optionally, the basic information of the power distribution device that is stored on the node on the power distribution device may be entered by technical support personnel. For example, it is assumed that the technical support personnel install the power distribution device on a floor of a residential building in a residential community. The technical support personnel may enter a position of the power distribution device onto a node on the power distribution device, where the position includes information such as a number of the residential building and a number of the floor. The node may receive the entered position of the power distribution device, read information such as the number of the power distribution device from the power distribution device, to obtain the basic information of the power distribution device, and then store the basic information of the power distribution device.

The gateway node may determine, based on a node located on each power distribution device, a power distribution device at each level in the power distribution grid, and may determine a lower-level power distribution device connected to the power distribution device at each level. In other words, the gateway node may determine, based on the node located on each power distribution device, which power distribution device is the first-level power distribution device 11 and which power distribution device is the second-level power distribution device 12 directly connected to the first-level power distribution device 12, which power distribution device is the second-level power distribution device 12 and which power distribution device is the third-level power distribution device 13 directly connected to the second-level power distribution device 12, . . . , and which power distribution device is an $(M-1)^{th}$-level power distribution device and which power distribution device is the $M^{th}$-level power distribution device 1M connected to the $(M-1)^{th}$-level power distribution device. A detailed implementation process in which the gateway node determines the power distribution device at each level and the connection relationship between all the power distribution devices is described in detail in the following embodiment shown in FIG. 7, and details are not described herein.

Figure 5:
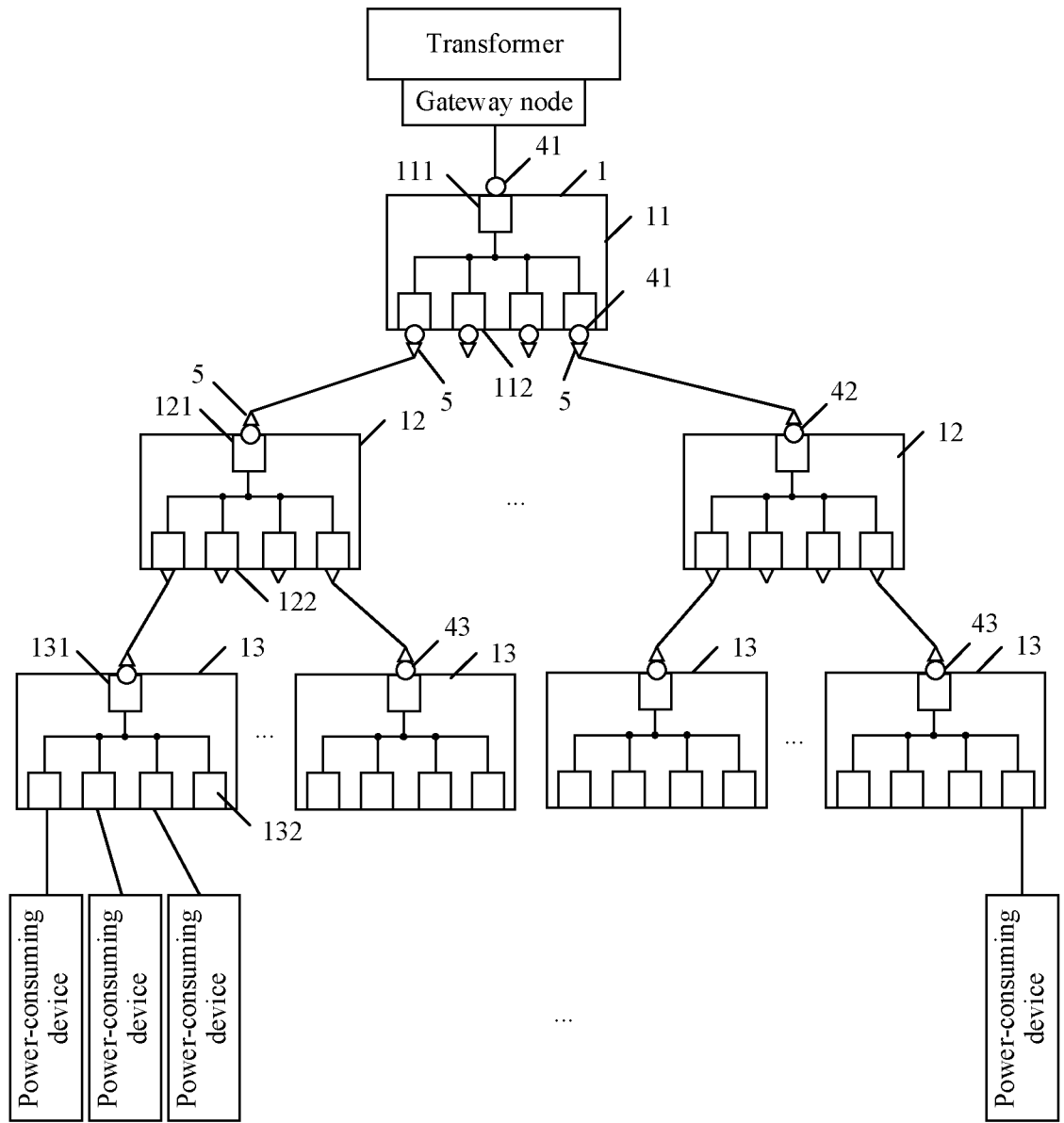
FIG. 5 is a schematic diagram of a structure of another power distribution grid according to an embodiment of this application.

Because each power distribution device includes one input end and a plurality of output ends, after the $(i-1)^{th}$-level power distribution device connected to the $i^{th}$-level power distribution device is determined, an output end that is of the $(i-1)^{th}$-level power distribution device and to which the $i^{th}$-level power distribution device is connected needs to be further determined. Refer to FIG. 5. To determine the output end that is of the $(i-1)^{th}$-level power distribution device and to which the $i^{th}$-level power distribution device is connected, an energy efficiency collection terminal 5 may be disposed at each output end of the first-level power distribution device 11 in the power distribution grid. For a power distribution device 1 at another level in the power distribution grid other than the first-level power distribution device 11, an energy efficiency collection terminal 5 may be disposed at an input end of the power distribution device and an energy efficiency collection terminal 5 may be disposed at each output end of the power distribution device.

An energy efficiency collection terminal 5 on any power distribution device in the power distribution grid is connected to a node on the power distribution device.

Optionally, when one node is disposed on the power distribution device, each energy efficiency collection terminal 5 on the power distribution device is connected to the node. When a node is disposed at the input end of the power distribution device and a node is disposed at each output end of the power distribution device, the energy efficiency collection terminal 5 disposed at the input end of the power distribution device may be connected to the node disposed at the input end, and the energy efficiency collection terminal 5 disposed at each output end of the power distribution device may be connected to the node disposed at the output end.

The gateway node may determine, based on an energy efficiency collection terminal 5 located at an output end of the $(i-1)^{th}$-level power distribution device and an energy efficiency collection terminal 5 located at an input end of each $i^{th}$-level power distribution device, an output end that is of the $(i-1)^{th}$-level power distribution device and to which each $i^{th}$-level power distribution device is connected. For a detailed determining process, refer to the following embodiment shown in FIG. 8A and FIG. 8B, and details are not described herein.

Figure 6:
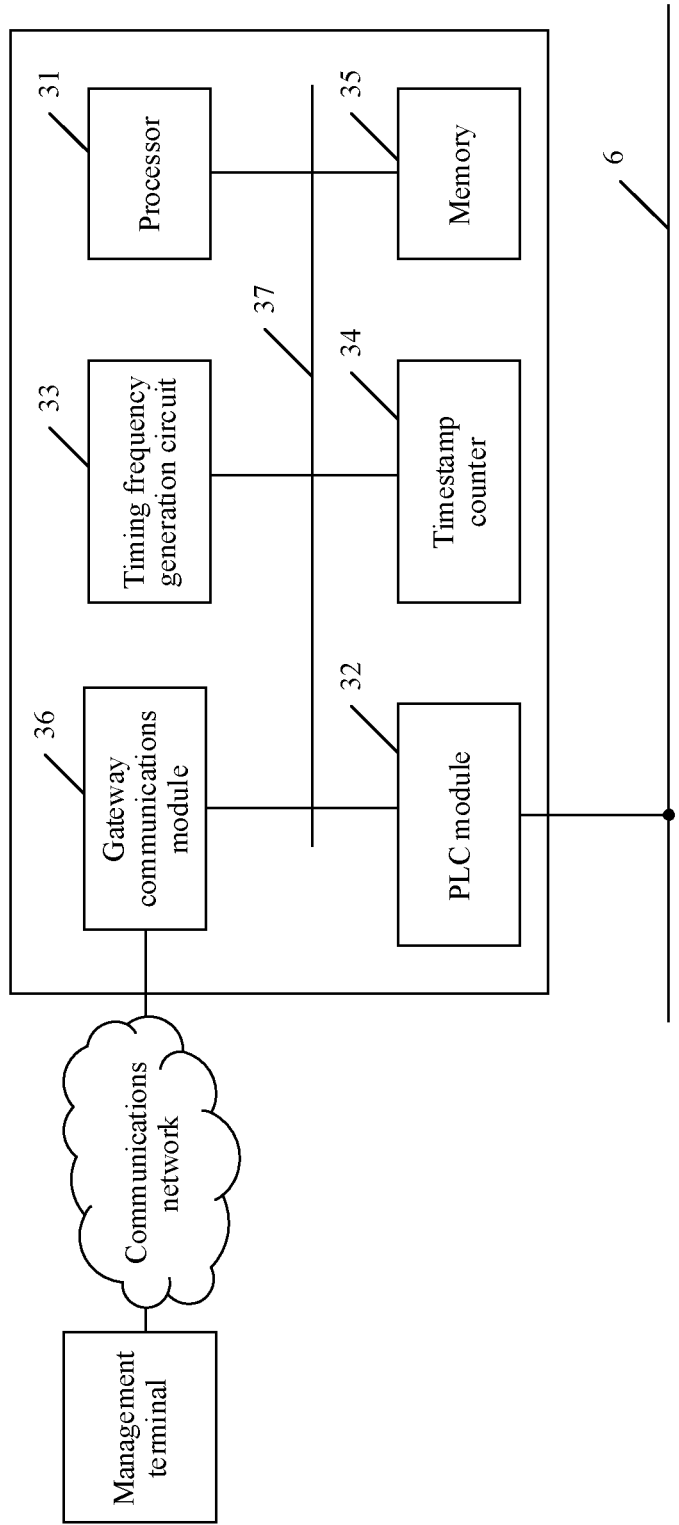
FIG. 6 is a schematic diagram of a structure of a gateway node according to an embodiment of this application.

Refer to FIG. 6. An embodiment of this application provides a gateway node. The gateway node is a gateway node disposed in the foregoing power distribution grid, and includes a processor 31, a PLC module 32, a timing frequency generation circuit 33, a timestamp counter 34, a memory 35, and a gateway communications module 36. The processor 31, the PLC module 32, the timing frequency generation circuit 33, the timestamp counter 34, the memory 35, and the gateway communications module 36 may be connected through a bus 37, and the PLC module 32 is connected to a power line 6 of the power distribution grid.

The processor 31 may send, in the power distribution grid through the PLC module 32, a packet to a node in the power distribution grid, or receive, in the power distribution grid through the PLC module 32, a packet sent by a node in the power distribution grid. The node in the power distribution grid includes a node located on a power distribution device in the power distribution grid. The PLC module 32 includes a PLC media access control (MAC) and physical layer (PHY) communications module, and the PLC media access control and physical layer communications module is responsible for framing, deframing, modulation, and demodulation of a PLC carrier signal.

The timing frequency generation circuit 33 is configured to generate a timing frequency, and input the timing frequency into the timestamp counter 34. The timing frequency generated by the timing frequency generation circuit 33 is equal to a nominal timing frequency. The nominal timing frequency may be a timing frequency agreed upon by the gateway node and each node in the power distribution grid when the power distribution grid is constructed, or the nominal timing frequency is a timing frequency that is set on the gateway node at factory delivery.

Optionally, the timing frequency generation circuit 33 in the gateway node has high hardware performance, so that timing frequencies generated by the timing frequency generation circuit 33 at different times are equal to the nominal timing frequency.

The timestamp counter 34 is configured to perform counting based on the timing frequency. An interval between two consecutive times of counting performed by the timestamp counter 34 is equal to 1/f, where f represents the timing frequency, that is, a counting period of the timestamp counter 34 is 1/f.

For example, assuming that an initial value of the timestamp counter 34 is 0, the timestamp counter 34 increases a counted value to 1 when a first counting period starts, the timestamp counter 34 increases the counted value to 2 when a second counting period starts, and the timestamp counter 34 increases the counted value to 3 when a third counting period starts. The timestamp counter 34 repeats the foregoing process, to be specific, increases the counted value by 1 each time a counting period elapses.

A product of a value currently counted by the timestamp counter 34 and 1/f is equal to a current timestamp.

The memory 35 is configured to store a computer program. The computer program may be invoked and executed by the processor 31, so that the processor 31 may obtain a data transmission parameter between the gateway node and a node in the power distribution grid through the timestamp counter 34 and the PLC module 32, where the data transmission parameter includes a data transmission time or a data transmission distance, and then generate a physical network topology of the power distribution grid based on the obtained data transmission parameter. For a detailed process in which the processor 31 obtains the data transmission parameter and a detailed process in which the processor 31 generates the physical network topology, refer to related content in the following embodiment shown in FIG. 8A and FIG. 8B, and details are not described herein.

The gateway communications module 36 may be connected to a communications network, and may establish a network connection to a management terminal of an administrator through the communications network. The gateway communications module 36 includes a Transmission Control Protocol (TCP)/Internet Protocol (IP) network interface and a PLC network interface. The gateway communications module 36 is connected to the communications network through the TCP/IP network interface, and is connected to the PLC module 32 through the PLC network interface. The gateway communications module 36 is configured to convert a packet format, to be specific, convert a packet format used for transmission in the PLC network into a packet format that can be used for transmission in the communications network, or convert a packet format used for transmission in the communications network into a packet format that can be used for transmission in the PLC network.

Optionally, the PLC module 32 may be a chip that implements a PLC protocol, for example, a dedicated PLC chip, and may include a module or a circuit that implements PLC MAC layer and PHY communication, and a module or a circuit that implements framing, deframing, modulation, and demodulation of a PLC carrier signal.

Optionally, the processor 31 may be a general-purpose CPU, a network processor (NP), or a combination of a CPU and an NP. The processor 31 may further include a hardware chip. The hardware chip may be a microcontroller unit (MCU), an application-specific integrated circuit (ASIC), a complex programmable logic device (CPLD), a field-programmable gate array (FPGA), generic array logic (GAL), one or more integrated circuits configured to control program execution in the solutions of this application, or any combination thereof.

The memory 35 may be a random-access memory (RAM) or another type of dynamic storage device that can store information and instructions, a magnetic disk storage medium or another magnetic storage device, or any other medium that can be used to carry or store expected program code in a form of instructions or a data structure and that can be accessed by a computer, but is not limited thereto. The memory may exist independently, and is connected to a forwarding chip through a bus. Alternatively, the memory may be integrated with a forwarding chip.

Figure 7:
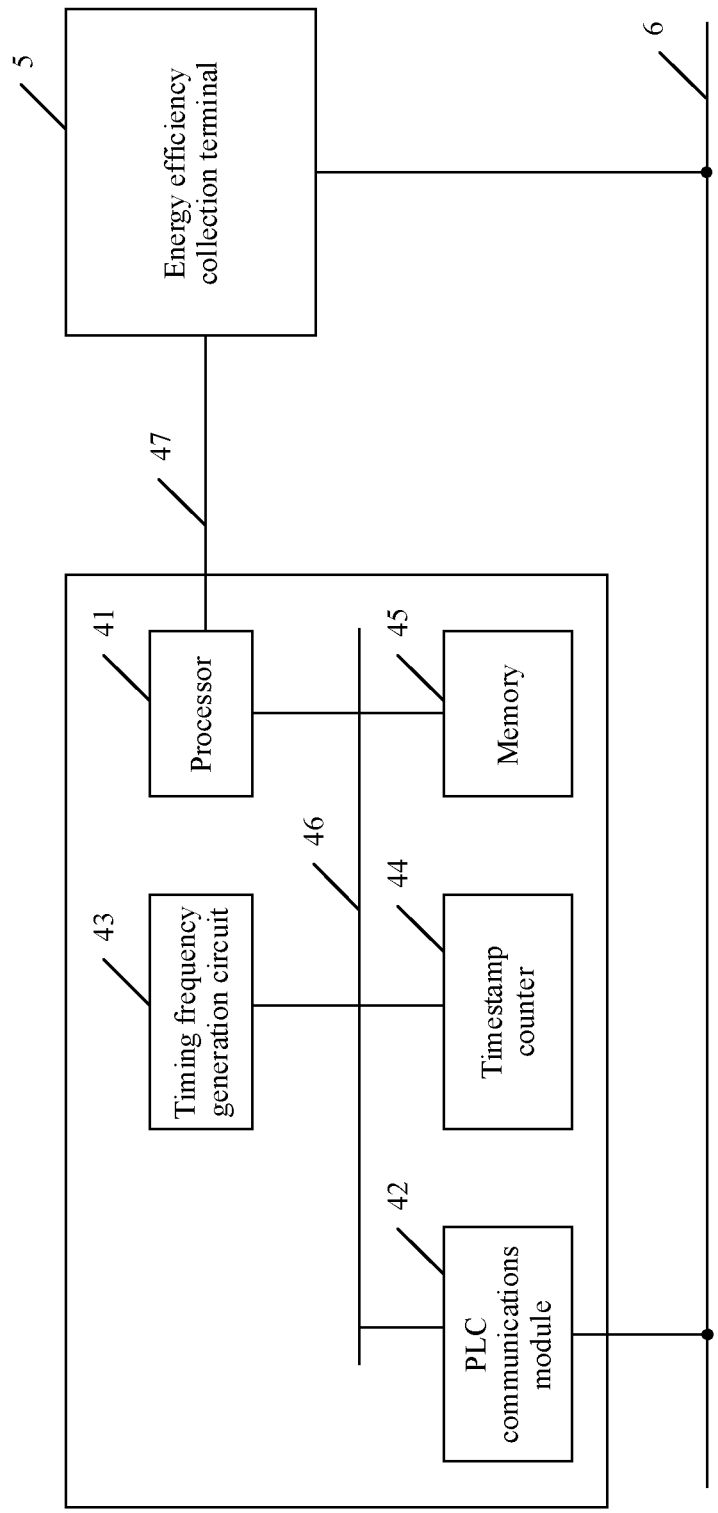
FIG. 7 is a schematic diagram of a structure of a node according to an embodiment of this application.

Refer to FIG. 7. An embodiment of this application provides an apparatus for generating a physical network topology. The apparatus for generating a physical network topology is configured to implement a node on the foregoing power distribution device, and includes a processor 41, a PLC module 42, a timing frequency generation circuit 43, a timestamp counter 44, and a memory 45. The processor 41, the PLC module 42, the timing frequency generation circuit 43, the timestamp counter 44, and the memory 45 may be connected through a bus 46.

Refer to FIG. 7. The processor 41 is further connected to an energy efficiency collection terminal 5 located on the power distribution device. Optionally, the energy efficiency collection terminal 5 located on the power distribution device may be connected to the processor 41 through a RS485 interface. The PLC module 42 and the energy efficiency collection terminal 5 are both connected to a power line 6 connected to the power distribution device.

The processor 41 may send a packet or receive a packet in a power distribution grid through the PLC module 42. The PLC module 42 includes a PLC MAC layer and PHY communications module, and the PLC MAC layer and PHY communications module is responsible for framing, deframing, modulation, and demodulation of a PLC carrier signal.

The timing frequency generation circuit 43 is configured to generate a timing frequency, and input the timing frequency into the timestamp counter 44.

Optionally, the timing frequency generated by the timing frequency generation circuit 43 may be or may not be equal to a nominal timing frequency. The nominal timing frequency may be a timing frequency agreed upon by the node and a gateway node when the power distribution grid is constructed, or the nominal timing frequency is a timing frequency that is set on the node at factory delivery, and the nominal timing frequency is the same as a nominal timing frequency stored on the gateway node.

Optionally, the timing frequency generation circuit 43 in the node may have low hardware performance. In this case, the timing frequency generation circuit 43 may generate different timing frequencies at different times when the timing frequency generation circuit 43 is affected by environmental factors such as temperature and/or humidity in an environment. To be specific, the timing frequencies generated at different times may be equal to the nominal timing frequency, may be greater than the nominal timing frequency, or may be less than the nominal timing frequency.

The timestamp counter 44 performs counting based on the timing frequency, where an interval between two consecutive times of counting is equal to a derivative of the timing frequency.

The memory 45 is configured to store computer-executable instructions. The processor 41 invokes and executes the computer-executable instructions, to measure, under the control of the gateway node, a data transmission parameter between the node and another node in the power distribution grid through the PLC module 42 and the timing frequency generation circuit 43, where the data transmission parameter includes a data transmission time or a data transmission distance, and to send the data transmission parameter to the gateway node through the PLC module 42, so that the gateway node generates a physical network topology of the power distribution grid based on the data transmission parameter. A detailed implementation process of obtaining the data transmission parameter is described in detail in the following embodiment shown in FIG. 8A and FIG. 8B, and details are not described herein.

Optionally, the PLC module 42 may be a chip that implements a PLC protocol, for example, a dedicated PLC chip, and may include a module or a circuit that implements PLC MAC layer function and a PLC PHY function, and a module or a circuit that implements framing, deframing, modulation, and demodulation of a PLC carrier signal.

Optionally, the processor 41 may be a CPU, an NP, or a combination of a CPU and an NP. The processor 41 may further include a hardware chip. The hardware chip may be an MCU, an ASIC, an FPGA, a CPLD, one or more integrated circuits configured to control program execution in the solutions of this application, or any combination thereof.

The memory 45 may be a RAM or another type of dynamic storage device that can store information and instructions, a magnetic disk storage medium or another magnetic storage device, or any other medium that can be used to carry or store expected program code in a form of instructions or a data structure and that can be accessed by a computer, but is not limited thereto. The memory may exist independently, and is connected to a forwarding chip through a bus. Alternatively, the memory may be integrated with a forwarding chip.

Figure 8A:
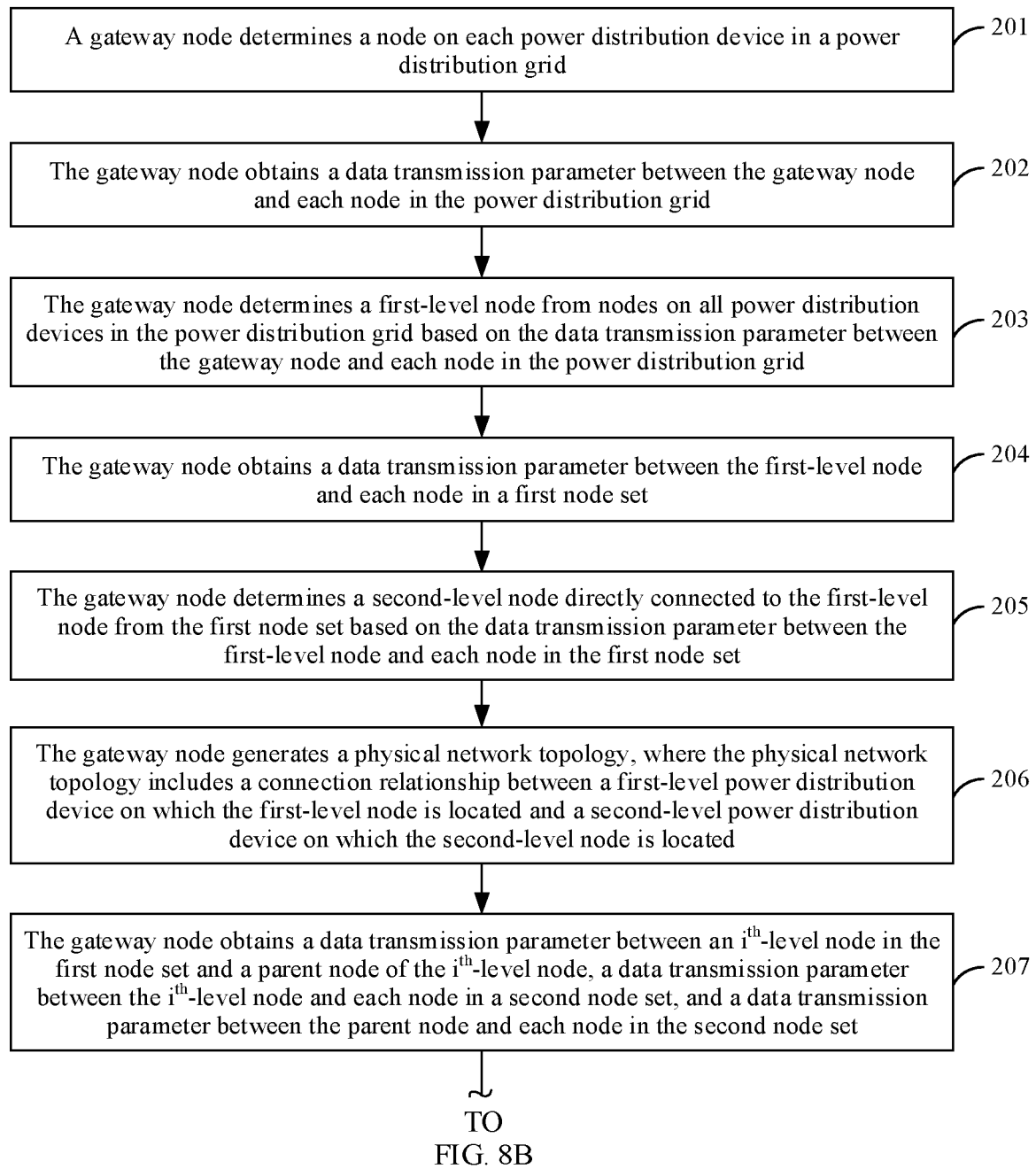
FIG. 8A and FIG. 8B are a flowchart of a method for generating a physical network topology according to an embodiment of this application.
Figure 8B:
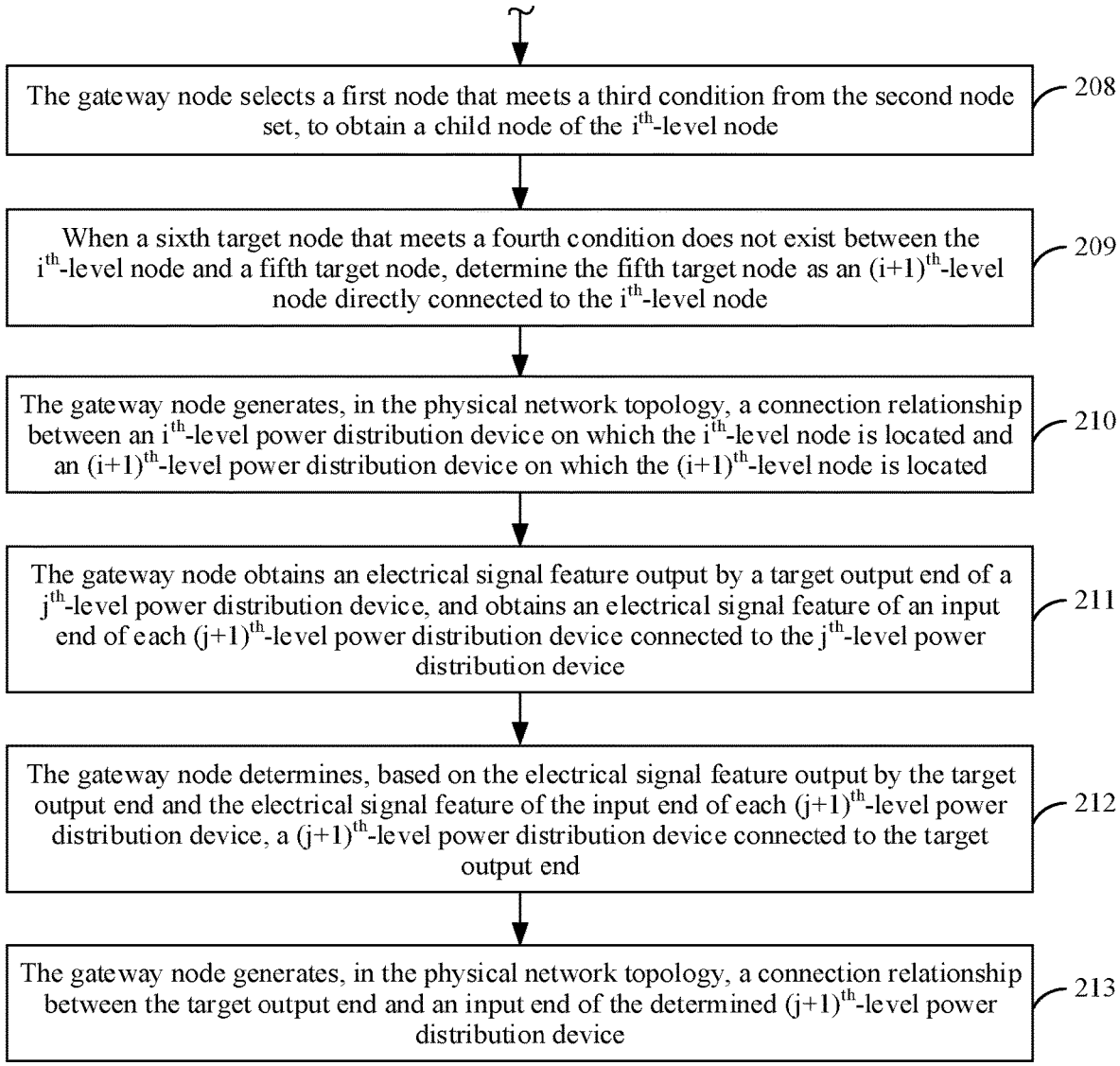

Refer to FIG. 8A and FIG. 8B. An embodiment of this application provides a method for generating a physical network topology. The method may be applied to any one of the power distribution grids shown in FIG. 3 to FIG. 5, to generate a physical network topology of the power distribution grid. The method includes the following steps.

Step 201: A gateway node determines a node on each power distribution device in the power distribution grid.

Step 202: The gateway node obtains a data transmission parameter between the gateway node and each node in the power distribution grid.

Step 203: The gateway node determines a first-level node from nodes on all power distribution devices in the power distribution grid based on the data transmission parameter between the gateway node and each node in the power distribution grid.

Step 204: The gateway node obtains a data transmission parameter between the first-level node and each node in a first node set.

Step 205: The gateway node determines a second-level node directly connected to the first-level node from the first node set based on the data transmission parameter between the first-level node and each node in the first node set.

Step 206: The gateway node generates the physical network topology, where the physical network topology includes a connection relationship between a first-level power distribution device on which the first-level node is located and a second-level power distribution device on which the second-level node is located.

Step 207: The gateway node obtains a data transmission parameter between an $i^{th}$-level node in the first node set and a parent node of the $i^{th}$-level node, a data transmission parameter between the $i^{th}$-level node and each node in a second node set, and a data transmission parameter between the parent node and each node in the second node set, where i=2, 3, . . . , and the second node set includes a node located on a power distribution device at each level that is located after an $i^{th}$-level power distribution device.

Step 208: The gateway node selects a first node that meets a third condition from the second node set, to obtain a child node of the $i^{th}$-level node.

Step 209: When a sixth target node that meets a fourth condition does not exist between the $i^{th}$-level node and a fifth target node, determine the fifth target node as an $(i+1)^{th}$-level node directly connected to the $i^{th}$-level node.

Step 210: The gateway node generates, in the physical network topology, a connection relationship between the $i^{th}$-level power distribution device on which the $i^{th}$-level node is located and an $(i+1)^{th}$-level power distribution device on which the $(i+1)^{th}$-level node is located. The foregoing process of steps 207 to 210 are repeated until power distribution devices at all levels in the power distribution grid and a connection relationship between the power distribution devices at all levels are determined.

Step 211: The gateway node obtains an electrical signal feature output by a target output end of a $j^{th}$-level power distribution device, and obtains an electrical signal feature of an input end of each $(j+1)^{th}$-level power distribution device connected to the $j^{th}$-level power distribution device, where the target output end is any output end of the $j^{th}$-level power distribution device.

Step 212: The gateway node determines, based on the electrical signal feature output by the target output end and the electrical signal feature of the input end of each $(j+1)^{th}$-level power distribution device, a $(j+1)^{th}$-level power distribution device connected to the target output end.

Step 213: The gateway node generates, in the physical network topology, a connection relationship between the target output end and an input end of the determined $(j+1)^{th}$-level power distribution device.

The gateway node repeats steps 211 to 213, to determine a $(j+1)^{th}$-level power distribution device connected to each output end of the $j^{th}$-level power distribution device, and generate, in the physical network topology, a connection relationship between an output end of the $j^{th}$-level power distribution device and an input end of a $(j+1)^{th}$-level power distribution device connected to the output end.

In step 201, optionally, when an administrator needs to generate the physical network topology of the power distribution grid, a management terminal corresponding to the administrator may send a generation instruction to the gateway node through a communications network. The gateway node receives the generation instruction, and then starts to perform a process of generating the physical network topology of the power distribution grid. Certainly and alternatively, no instruction may be generated, and the process of generating the physical network topology of the power distribution grid may be automatically performed after the power distribution grid is constructed and the gateway node is powered on for the first time.

In step 201, the gateway node may broadcast a first instruction in the power distribution grid. A node located on each power distribution device in the power distribution grid receives the first instruction, and sends a notification packet to the gateway node, where the notification packet includes an identifier of the node and basic information of the power distribution device on which the node is located. The gateway node receives the identifier of the node and the basic information of the power distribution device on which the node is located, and stores a correspondence between the identifier of the node and the basic information of the power distribution device on which the node is located into a node list. In the foregoing manner, an identifier of each node and basic information of a power distribution device on which the node is located are correspondingly stored into the node list, so that the node on each power distribution device in the power distribution grid can be determined.

Optionally, the identifier of the node may be an address of the node, for example, may be a MAC address or an IP address of the node.

One or more nodes may be disposed on a power distribution device in the power distribution grid. When one node is disposed on the power distribution device, a notification packet sent by the node to the gateway node includes an identifier of the node and basic information of the power distribution device.

When a plurality of nodes is disposed on the power distribution device, a notification packet sent by any node on the power distribution device to the gateway node includes an identifier of the node, an identifier of a port on which the node is located, and basic information of the power distribution device, where the port is an input end or an output end of the power distribution device. The gateway node receives notification packets from the plurality of nodes located on the power distribution device. Because identifiers of the power distribution device that are sent by the plurality of nodes on the power distribution device are the same, the gateway node determines, based on the identifiers of the power distribution device that are sent by the plurality of nodes, that the plurality of nodes are located on the same power distribution device, and may select a node from the plurality of nodes, and correspondingly store an identifier of the selected node and basic information of the power distribution device into the node list.

Optionally, the gateway node may randomly select a node from the plurality of nodes, or select a node located at an input end of the power distribution device, and store a correspondence between an identifier of the selected node and the basic information of the power distribution device into the node list.

When a plurality of nodes are disposed on the power distribution device, the gateway node further correspondingly stores an identifier of each node, an identifier of a port on which each node is located, and an identifier of the power distribution device into a correspondence between an identifier of a node, an identifier of a port, and an identifier of a power distribution device.

Figure 9:
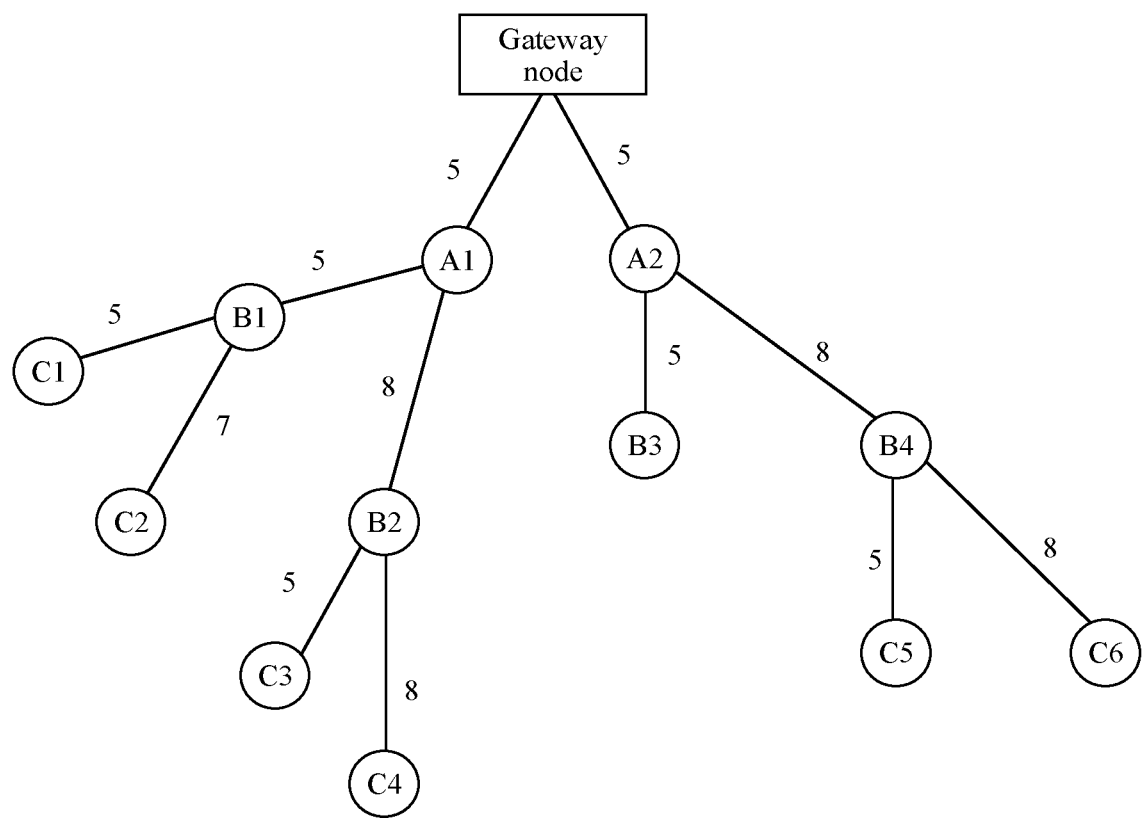
FIG. 9 is a schematic diagram of a structure of another power distribution grid according to an embodiment of this application.

For example, as shown in FIG. 9, the gateway node sends the first instruction in the power distribution grid, a node A1 receives the first instruction and sends a notification packet to the gateway node. The notification packet includes an identifier Node-A1 of the node A1 and basic information 11 of a power distribution device 11 (which is not shown in FIG. 9) on which the node A1 is located. The basic information 11 includes an identifier ID11 and a position P11 of the power distribution device 11 on which the node A1 is located. The gateway node correspondingly stores the identifier Node-A1 of the node A1 and the basic information 11 into a node list shown in Table 1. The gateway node continues to receive a notification packet from another node, and correspondingly stores an identifier of the node and basic information of a power distribution device in the notification packet into the node list shown in Table 1. After the gateway node receives a notification packet sent by each node in the power distribution grid, an obtained node list includes an identifier of each node in the power distribution grid, that is, the node on each power distribution device in the power distribution grid is determined.

TABLE 1

| Identifier of a node | Basic information of a power distribution device |
|---|---|
| Node-A1 | Basic information 11 (an identifier ID11 and a position P11 of a power distribution device 11) |
| Node-A2 | Basic information 12 (an identifier ID12 and a position P12 of a power distribution device 12) |
| . . . | . . . |

In step 202, the gateway node obtains the data transmission parameter between the gateway node and each node in the power distribution grid.

Further, a data transmission parameter between the gateway node and a node includes a data transmission distance or a data transmission time between the gateway node and the node.

The gateway node may select an identifier of a node from the node list, and obtain a data transmission parameter between the gateway node and the node corresponding to the identifier of the node.

A process in which the gateway node obtains the data transmission parameter between the gateway node and the node includes two phases. In a first phase, a frequency offset between timing frequencies of the node and the gateway node is first obtained. In a second phase, the data transmission parameter between the gateway node and the node is obtained based on the frequency offset.

Optionally, the gateway node obtains the frequency offset between the timing frequencies of the node and the gateway node by performing the following operations 2021 to 2023. Then, the gateway node obtains the data transmission parameter between the gateway node and the node by performing the following operations 2024 to 2027.

Figure 10:
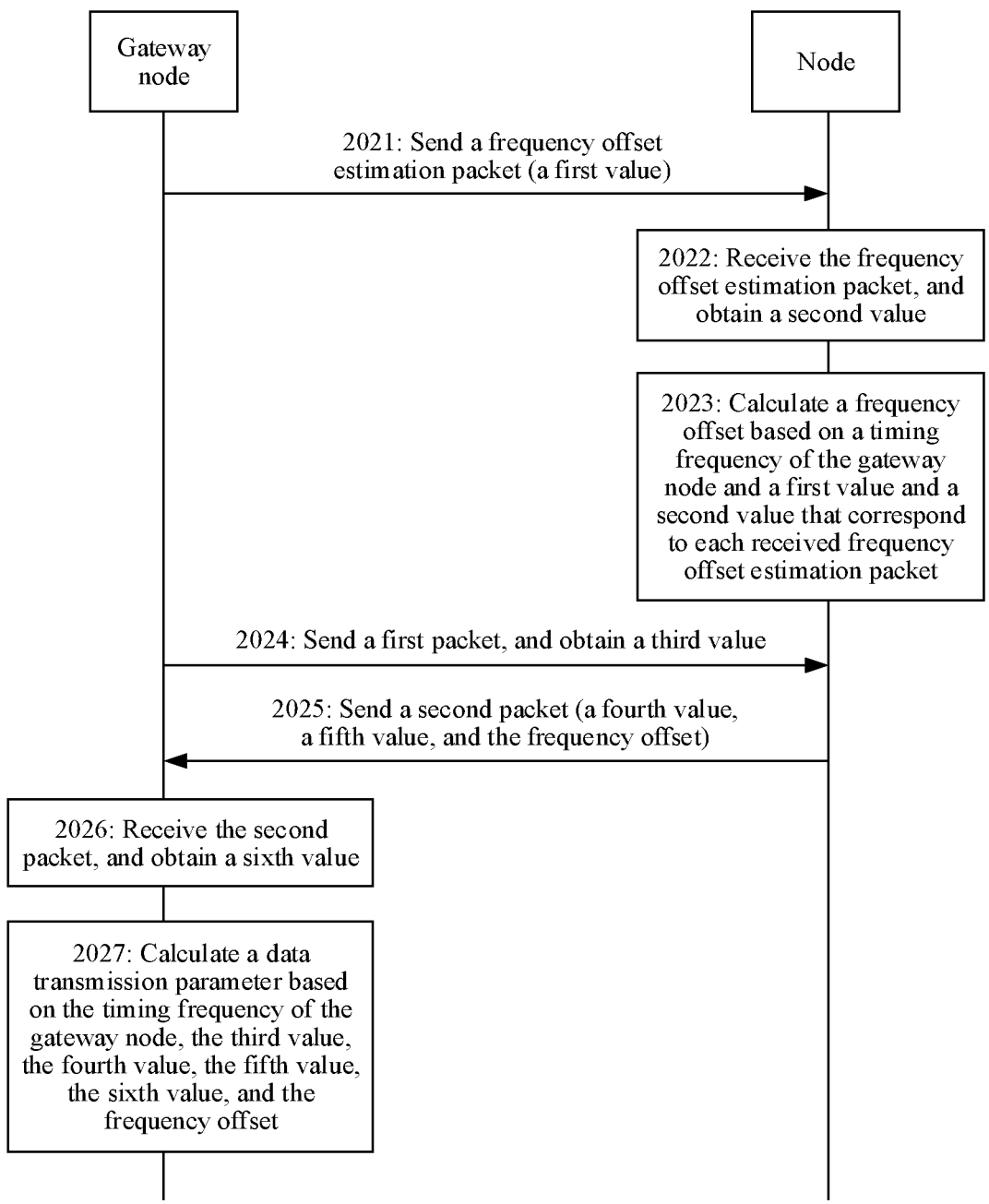
FIG. 10 is a flowchart of a method for obtaining a data transmission parameter according to an embodiment of this application.

Optionally, as shown in FIG. 10, the operations 2021 to 2027 may be as follows.

2021: The gateway node sends a frequency offset estimation packet to the node, where the frequency offset estimation packet includes a first value, and the first value is a value counted by a timestamp counter of the gateway node when the gateway node sends the frequency offset estimation packet.

The gateway node may send n frequency offset estimation packets to the node at different moments, where n is an integer value greater than 1. For each frequency offset estimation packet, when determining to send the frequency offset estimation packet, the gateway node obtains, as a first value, a value counted by the timestamp counter included in the gateway node, and sends the frequency offset estimation packet to the node, where the frequency offset estimation packet includes the first value. In other words, each frequency offset estimation packet corresponds to one first value.

Optionally, the gateway node may send the n frequency offset estimation packets to the node at different moments in a time window, where a time length of the time window is equal to a first time threshold. In other words, a time difference between a moment at which the gateway node sends a first frequency offset estimation packet and a moment at which the gateway node sends an $n^{th}$ frequency offset estimation packet is less than or equal to the first time threshold.

A timing frequency generation circuit of the node is affected by environmental factors such as temperature and/or humidity in an environment. The time difference between the moment at which the gateway node sends the first frequency offset estimation packet and the moment at which the gateway node sends the $n^{th}$ frequency offset estimation packet is less than or equal to the first time threshold. This can reduce impact of the environmental factor on obtaining of the frequency offset.

Optionally, the gateway node may send the frequency offset estimation packet to the node at equal intervals or unequal intervals.

Figures 11, 12:
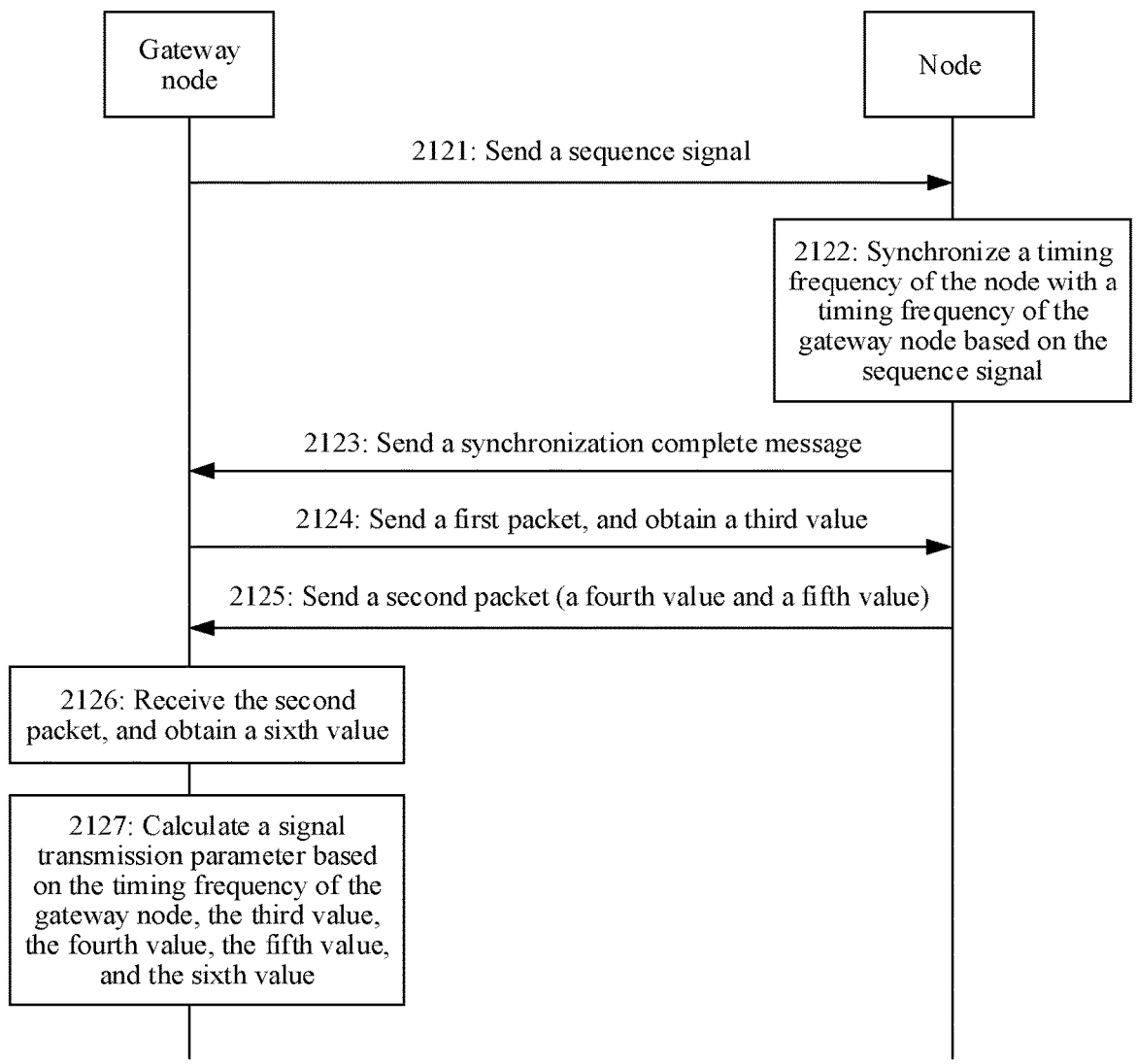
FIG. 11 is a schematic diagram of a structure of a frequency offset estimation packet according to an embodiment of this application.
FIG. 12 is a flowchart of another method for obtaining a data transmission parameter according to an embodiment of this application.

Optionally, as shown in a frequency offset estimation packet shown in FIG. 11, the frequency offset estimation packet includes a destination identifier field, a source identifier field, a measurement sequence number field, a transmit timestamp count value field, and a receive timestamp count value field.

When determining to send an $x^{th}$ frequency offset estimation packet, where x=1, 2, . . . , n, the gateway node reads a current count value from the timestamp counter of the gateway node as a first value corresponding to the $x^{th}$ frequency offset estimation packet, and sends the $x^{th}$ frequency offset estimation packet to the node. In the $x^{th}$ frequency offset estimation packet, a destination identifier field carries the identifier of the node, a source identifier field carries an identifier of the gateway node, a measurement sequence number field carries x, and a transmit timestamp count value field carries the first value corresponding to the $x^{th}$ frequency offset estimation packet. In this case, content carried in a receive timestamp count value field of the $x^{th}$ frequency offset estimation packet may be empty.

After the gateway node sends the $x^{th}$ frequency offset estimation packet in the power distribution grid, the $x^{th}$ frequency offset estimation packet is broadcast to each node in the power distribution grid.

2022: The node receives the frequency offset estimation packet, and obtains a second value, where the second value is a value counted by a timestamp counter of the node when the node receives the frequency offset estimation packet.

After any node in the power distribution grid receives the $x^{th}$ frequency offset estimation packet, the node determines whether the identifier carried in the destination identifier field of the $x^{th}$ frequency offset estimation packet is the same as an identifier of the node. If the identifier carried in the destination identifier field of the $x^{th}$ frequency offset estimation packet is different from the identifier of the node, the node discards the $x^{th}$ frequency offset estimation packet. If the identifier carried in the destination identifier field of the $x^{th}$ frequency offset estimation packet is the same as the identifier of the node, the node reads a current count value from a timestamp counter of the node as a second value, where the second value corresponds to the $x^{th}$ frequency offset estimation packet.

Optionally, the node sets the receive timestamp count value field of the $x^{th}$ frequency offset estimation packet to carry the second value corresponding to the $x^{th}$ frequency offset estimation packet, and stores the $x^{th}$ frequency offset estimation packet.

Optionally, the node may alternatively not store the $x^{th}$ frequency offset estimation packet, but store a correspondence between the first value and the second value that correspond to the $x^{th}$ frequency offset estimation packet.

After receiving a plurality of frequency offset estimation packets, the node obtains a first value and a second value that correspond to each of the plurality of frequency offset estimation packets, and then performs the following operation 2023.

2023: The node calculates the frequency offset between the timing frequencies of the node and the gateway node based on the timing frequency of the gateway node and the first value and the second value that correspond to each received frequency offset estimation packet.

When the power distribution grid is constructed, the gateway node and each node in the power distribution grid agree on a nominal timing frequency. Alternatively, the node stores a nominal timing frequency at factory delivery, where the nominal timing frequency stored on the node is equal to a nominal timing frequency on the gateway node.

The node may directly use the nominal timing frequency as the timing frequency of the gateway node.

In this step, the node selects any two frequency offset estimation packets from the n frequency offset estimation packets. It is assumed that the node selects the $x^{th}$ frequency offset estimation packet and a $y^{th}$ frequency offset estimation packet. A frequency offset is calculated according to the following first formula and based on the timing frequency of the gateway node, the first value and the second value that correspond to the $x^{th}$ frequency offset estimation packet, and a first value and a second value that correspond to the $y^{th}$ frequency offset estimation packet.

The first formula is: $(T_{1y}-T_{1x})/f=(T_{2y}-T_{2x})/(f+\Delta f)$.

In the first formula, $T_{1y}$ represents the first value corresponding to the $y^{th}$ frequency offset estimation packet, $T_{1x}$ represents the first value corresponding to the $x^{th}$ frequency offset estimation packet, f represents the timing frequency of the gateway node, $T_{2y}$ represents the second value corresponding to the $y^{th}$ frequency offset estimation packet, $T_{2x}$ represents the second value corresponding to the $x^{th}$ frequency offset estimation packet, and $\Delta f$ represents the frequency offset.

In this step, when n=2, a frequency offset calculated based on a first value and a second value that correspond to each of two frequency offset estimation packets is used as the frequency offset between the timing frequencies of the gateway node and the node. When n is greater than 2, two different frequency offset estimation packets are selected in the foregoing manner, and each time when two frequency offset estimation packets are selected, one frequency offset is calculated based on the timing frequency of the gateway node and a first value and a second value that correspond to each of the two selected frequency offset estimation packets. In this way, a plurality of frequency offsets can be calculated, an average value of the plurality of frequency offsets is calculated, and the average value is used as the frequency offset between the timing frequencies of the node and the gateway node.

Optionally, when the node stores the n frequency offset estimation packets, the node selects two frequency offset estimation packets from the stored n frequency offset estimation packets. The node stores a correspondence between a first value and a second value that correspond to a frequency offset estimation packet, and selects two records from the correspondence to obtain a first value and a second value that correspond to each of the two frequency offset estimation packets.

For example, in this step, the node selects the first frequency offset estimation packet and a second frequency offset estimation packet, and calculates a first frequency offset according to the foregoing first formula and based on the timing frequency of the gateway node, a first value and a second value that correspond to the first frequency offset estimation packet, and a first value and a second value that correspond to the second frequency offset estimation packet. The node selects the second frequency offset estimation packet and a third frequency offset estimation packet, and calculates a second frequency offset according to the foregoing first formula and based on the timing frequency of the gateway node, the first value and the second value that correspond to the second frequency offset estimation packet, and a first value and a second value that correspond to the third frequency offset estimation packet. The foregoing process is repeated until the node selects an $(n-1)^{th}$ frequency offset estimation packet and the $n^{th}$ frequency offset estimation packet, and calculates an $(n-1)^{th}$ frequency offset according to the foregoing first formula and based on the timing frequency of the gateway node, a first value and a second value that correspond to the $(n-1)^{th}$ frequency offset estimation packet, and a first value and a second value that correspond to the $n^{th}$ frequency offset estimation packet. In this way, the node obtains n−1 frequency offsets, calculates an average value based on the n−1 frequency offsets, and uses the average value as the frequency offset between the timing frequencies of the node and the gateway node.

Optionally, the frequency offset between the timing frequencies of the gateway node and the node may alternatively be directly obtained by the gateway node, that is, the gateway node sends a second instruction to the node. The node receives the second instruction, and sends n frequency offset estimation packets to the gateway node at different moments. Any frequency offset estimation packet includes a first value, and the first value is a value counted by the timestamp counter of the node when the node sends the frequency offset estimation packet. The gateway node receives the frequency offset estimation packet, and obtains a second value, where the second value is a value counted by the timestamp counter of the gateway node when the gateway node receives the frequency offset estimation packet. In this way, the gateway node obtains the first value and the second value that corresponds to the frequency offset estimation packet. After obtaining a first value and a second value that correspond to each of a plurality of frequency offset estimation packets, the gateway node calculates a frequency offset between timing frequencies of the node and the gateway node based on the first value and the second value that correspond to each of the plurality of frequency offset estimation packets and the timing frequency of the gateway node.

After the frequency offset between the timing frequencies of the node and the gateway node is calculated, the data transmission parameter between the gateway node and the node may be obtained by performing the following operations 2024 to 2027.

2024: The gateway node sends a first packet to the node, and obtains a third value, where the third value is a value counted by the timestamp counter of the gateway node when the gateway node sends the first packet.

2025: The node receives the first packet, and sends a second packet to the gateway node, where the second packet includes a fourth value, a fifth value, and the frequency offset between the timing frequencies of the node and the gateway node.

The fourth value is a value counted by the timestamp counter of the node when the node receives the first packet, and the fifth value is a value counted by the timestamp counter of the node when the node sends the second packet.

2026: The gateway node receives the second packet returned by the node, and obtains a sixth value, where the sixth value is a value counted by the timestamp counter of the gateway node when the gateway node receives the second packet.

2027: The gateway node calculates the data transmission parameter between the gateway node and the node based on the timing frequency of the gateway node, the frequency offset between the timing frequencies of the node and the gateway node, the third value, the fourth value, the fifth value, and the sixth value.

In this step, a data transmission time between the gateway node and the node is calculated according to the following second formula and based on the timing frequency of the gateway node, the frequency offset between the timing frequencies of the node and the gateway node, the third value, the fourth value, the fifth value, and the sixth value.

The second formula is: $t=((t_4-t_1)/f-(t_3-t_2)/(f+\Delta f))/2$.

In the second formula, t represents the data transmission time between the gateway node and the node, $t_1$ represents the third value, $t_2$ represents the fourth value, $t_3$ represents the fifth value, and $t_4$ represents the sixth value.

Optionally, the gateway node may send a plurality of first packets to the node. In this case, the gateway node repeatedly performs the foregoing operations 2024 to 2027, to calculate a plurality of data transmission times between the gateway node and the node, calculate an average value of the plurality of data transmission times, and use the average value as a final data transmission time between the gateway node and the node.

Optionally, the gateway node may further calculate a data transmission distance between the gateway node and the node based on the data transmission time. The data transmission parameter between the gateway node and the node may be the data transmission time or the data transmission distance.

Optionally, in addition to a manner of obtaining the data transmission parameter between the gateway node and the node by performing the foregoing operations 2021 to 2027, the gateway node may alternatively obtain the data transmission parameter between the gateway node and the node in another manner. For example, as shown in FIG. 12, the following operations 2121 to 2127 may alternatively be performed. The operations 2121 to 2127 may be as follows.

2121: The gateway node sends a sequence signal to the node, where the sequence signal is determined based on the timing frequency of the gateway node.

A signal change frequency of the sequence signal may be L times the timing frequency of the gateway node, where L is a value greater than 0.

Optionally, the sequence signal may be a bit sequence, the bit sequence includes a first bit value and a second bit value, and a change frequency of the first bit value in the bit sequence is L times the timing frequency of the gateway node.

The first bit value may be a value 0, and the second bit value may be a value 1. Alternatively, the first bit value may be a value 1, and the second bit value may be a value 0.

2122: The node receives the sequence signal, and synchronizes the timing frequency of the node with the timing frequency of the gateway node based on the sequence signal.

The timing frequency generation circuit of the node includes a phase-locked loop and a crystal oscillator, and the crystal oscillator may generate a timing frequency under the control of the phase-locked loop. When receiving the sequence signal, the node inputs the sequence signal into the phase-locked loop. The phase-locked loop may determine, based on the sequence signal, a timing frequency currently generated by the gateway node, and synchronize the timing frequency generated by the crystal oscillator of the node with the timing frequency generated by the gateway node.

2123: The node sends a synchronization complete message to the gateway node.

2124: The gateway node receives the synchronization complete message, sends a first packet to the node, and obtains a third value, where the third value is a value counted by the timestamp counter of the gateway node when the gateway node sends the first packet.

2125: The node receives the first packet, and sends a second packet to the gateway node, where the second packet includes a fourth value and a fifth value.

The fourth value is a value counted by the timestamp counter of the node when the node receives the first packet, and the fifth value is a value counted by the timestamp counter of the node when the node sends the second packet.

2126: The gateway node receives the second packet returned by the node, and obtains a sixth value, where the sixth value is a value counted by the timestamp counter of the gateway node when the gateway node receives the second packet.

2127: The gateway node calculates the data transmission parameter between the gateway node and the node based on the timing frequency of the gateway node, the third value, the fourth value, the fifth value, and the sixth value.

In this step, a data transmission time between the gateway node and the node is calculated according to the following third formula and based on the timing frequency of the gateway node, the third value, the fourth value, the fifth value, and the sixth value.

The third formula is: $t=((t_4-t_1)/f-(t_3-t_2)/f)/2$.

Optionally, the gateway node may send a plurality of first packets to the node. In this case, the gateway node repeatedly performs the foregoing operations 2124 to 2127, to calculate a plurality of data transmission times between the gateway node and the node, calculate an average value of the plurality of data transmission times, and use the average value as a final data transmission time between the gateway node and the node.

The gateway node may further calculate a data transmission distance between the gateway node and the node based on the data transmission time. The data transmission parameter between the gateway node and the node may be the data transmission time or the data transmission distance.

It should be noted that after this step, the gateway node obtains a frequency offset between timing frequencies of the gateway node and each node in the power distribution grid.

In step 203, the gateway node determines the first-level node from the nodes on all the power distribution devices in the power distribution grid based on the data transmission parameter between the gateway node and each node in the power distribution grid.

Optionally, when a fourth target node that meets a second condition does not exist between the gateway node and a third target node, the third target node is determined as the first-level node directly connected to the gateway node. The third target node is any node in the power distribution grid, and the fourth target node is a node in the power distribution grid other than the third target node. The second condition is that a fourth data transmission parameter is equal to a value obtained by adding a fifth data transmission parameter and a sixth data transmission parameter, the fourth data transmission parameter is a data transmission parameter between the gateway node and the third target node, the fifth data transmission parameter is a data transmission parameter between the gateway node and the fourth target node, and the sixth data transmission parameter is a data transmission parameter between the fourth target node and the third target node.

Further, step 203 may be implemented by performing the following operations 2031 to 2036, and the operations 2031 to 2036 are as follows.

2031: The gateway node selects a node from nodes in the power distribution grid as the third target node, and selects another node from the nodes in the power distribution grid as the fourth target node.

For example, as shown in FIG. 9, the gateway node selects a node A1 from the power distribution grid as the third target node, and selects a node A2 from the power distribution grid as the fourth target node.

2032: The gateway node obtains the sixth data transmission parameter between the third target node and the fourth target node.

In this step, the gateway node may send a measurement request to the third target node in the power distribution grid, where the measurement request includes a frequency offset between timing frequencies of the gateway node and the third target node, a frequency offset between timing frequencies of the gateway node and the fourth target node, and an identifier of the fourth target node. The third target node receives the measurement request, obtains the sixth data transmission parameter between the third target node and the fourth target node, and sends a measurement response to the gateway node, where the measurement response carries the sixth data transmission parameter. The gateway node receives the measurement response, and reads the sixth data transmission parameter between the third target node and the fourth target node from the measurement response.

Optionally, after receiving the measurement request, the third target node may obtain the sixth data transmission parameter between the third target node and the fourth target node by performing the following operations (1) to (5).

(1) The third target node calculates the timing frequency of the third target node based on the timing frequency of the gateway node and the frequency offset between the timing frequencies of the gateway node and the third target node, and calculates the timing frequency of the fourth target node based on the timing frequency of the gateway node and the frequency offset between the timing frequencies of the gateway node and the fourth target node.

(2) The third target node sends a first packet to the fourth target node, and obtains a seventh value, where the seventh value is a value counted by a timestamp counter of the third target node when the third target node sends the first packet.

(3) The fourth target node receives the first packet, and sends a second packet to the third target node, where the second packet includes an eighth value and a ninth value.

The eighth value is a value counted by a timestamp counter of the fourth target node when the fourth target node receives the first packet, and the ninth value is a value counted by the timestamp counter of the fourth target node when the fourth target node sends the second packet.

(4) The third target node receives the second packet returned by the fourth target node, and obtains a tenth value, where the tenth value is a value counted by the timestamp counter of the third target node when the third target node receives the second packet.

(5) The third target node calculates the data transmission parameter between the third target node and the fourth target node based on the timing frequency of the third target node, the timing frequency of the fourth target node, the seventh value, the eighth value, the ninth value, and the tenth value.

In this step, a data transmission time between the third target node and the fourth target node is calculated according to the following fourth formula and based on the timing frequency of the third target node, the timing frequency of the fourth target node, the third value, the fourth value, the fifth value, and the sixth value.

The fourth formula is: $t'=((t_8-t_5)/f_3-(t_7-t_6)/f_4)/2$.

In the fourth formula, t' represents the data transmission time between the third target node and the fourth target node, $t_5$ represents the seventh value, $t_6$ represents the eighth value, $t_7$ represents the ninth value, $t_8$ represents the tenth value, $f_3$ represents the timing frequency of the third target node, and $f_4$ represents the timing frequency of the fourth target node.

Optionally, the third target node may send a plurality of first packets to the fourth target node. In this case, the third target node repeatedly performs the foregoing operations (2) to (5), to calculate a plurality of data transmission times between the third target node and the fourth target node, calculate an average value of the plurality of data transmission times, and use the average value as a final data transmission time between the third target node and the fourth target node.

Optionally, the third target node may further calculate a data transmission distance between the third target node and the fourth target node based on the data transmission time. The data transmission parameter between the third target node and the fourth target node may be the data transmission time or the data transmission distance.

2033: The gateway node determines whether the fourth data transmission parameter between the gateway node and the third target node, the fifth data transmission parameter between the gateway node and the fourth target node, and the sixth data transmission parameter between the fourth target node and the third target node meet the second condition. If the fourth data transmission parameter between the gateway node and the third target node, the fifth data transmission parameter between the gateway node and the fourth target node, and the sixth data transmission parameter between the fourth target node and the third target node do not meet the second condition, the gateway node performs 2034. If the fourth data transmission parameter between the gateway node and the third target node, the fifth data transmission parameter between the gateway node and the fourth target node, and the sixth data transmission parameter between the fourth target node and the third target node meet the second condition, the gateway node performs 2036.

The fourth data transmission parameter is the data transmission parameter between the gateway node and the third target node that is obtained in step 202, and the fifth data transmission parameter is the data transmission parameter between the gateway node and the fourth target node that is obtained in step 202.

For example, as shown in FIG. 9, a fourth data transmission parameter between the gateway node and the third target node A1 is 5, a fifth data transmission parameter between the gateway node and the fourth target node A2 is 5, and a sixth data transmission parameter between the fourth target node A2 and the third target node A1 is 10. It is determined that the fourth data transmission parameter 5 is not equal to a value obtained by adding the fifth data transmission parameter 5 and the sixth data transmission parameter 10. In this case, 2034 is performed.

2034: The gateway node determines whether at least one node that has not been selected as the fourth target node exists in nodes in the power distribution grid other than the third target node. If the node exists, the gateway node selects, as the fourth target node, a node from the node that has not been selected as the fourth target node, and goes back to perform 2032. If the node does not exist, the gateway node performs 2035.

For example, as shown in FIG. 9, the gateway node selects, as the fourth target node, a node B1 from nodes other than the third target node A1 that have not been selected as the fourth target node. An obtained sixth data transmission parameter between the third target node A1 and the fourth target node B1 is 5, and an obtained fifth data transmission parameter between the gateway node and the fourth target node B1 is 10. It is determined that the fourth data transmission parameter 5 is not equal to a value obtained by adding the fifth data transmission parameter 10 and the sixth data transmission parameter 5. The foregoing process is repeated, and it is found that after each node in the power distribution grid other than the third target node A1 is selected, no fourth target node that meets the second condition is determined. In this case, the following 2035 is performed.

2035: The gateway node uses the third target node as a first-level node directly connected to the gateway node, and performs 2036.

For example, the third target node A1 is used as a first-level node directly connected to the gateway node.

2036: The gateway node determines whether at least one node that has not been selected as the third target node exists in the power distribution grid. If the node exists, the gateway node selects, as the third target node, a node from the node that has not been selected as the third target node, selects a node from nodes in the power distribution grid other than the third target node as the fourth target node, and goes back to perform 2032. If the node does not exist, the process ends.

For example, as shown in FIG. 9, the gateway node selects, as the third target node, a node A2 from nodes that have not been selected as the third target node, and selects a node B1 from nodes in the power distribution grid other than the third target node A2 as the fourth target node. Then, the gateway node goes back to start from step 2032, and determines that the third target node A2 is also a first-level node directly connected to the gateway node. Then, the gateway node continues to select, as the third target node, the node B1 from the nodes that have not been selected as the third target node, selects a node B2 from nodes in the power distribution grid other than the third target node B1 as the fourth target node, and then goes back to start from step 2032. The foregoing process is repeated until at least one node that has not been selected as the third target node does not exist in the power distribution grid. In the example shown in FIG. 9, the first-level node A1 and a second-level node A2 are finally determined by performing the foregoing process.

Optionally, steps 202 and 203 are optional steps. In other words, the gateway node may determine the first-level node in another manner. For example, when the first-level node located on the first-level power distribution device sends a notification packet to the gateway node, the notification packet may carry an identifier of the first-level node. In this way, the gateway node may determine the first-level node based on the identifier of the first-level node in the notification packet.

Optionally, when the power distribution grid includes one first-level power distribution device, the gateway node selects, from nodes in the power distribution grid, a node having a smallest data transmission parameter between the node and the gateway node as the first-level node.

In step 204, the gateway node obtains the data transmission parameter between the first-level node and each node in the first node set.

Further, when the power distribution grid includes one first-level power distribution device, the first node set includes a node located on a power distribution device at another level in the power distribution grid other than the first-level power distribution device, and the node included in the first node set is a child node of the first-level node. When the power distribution grid includes a plurality of first-level power distribution devices, the first node set may include a child node of the first-level node.

The gateway node sends a measurement request to the first-level node in the power distribution grid, where the measurement request includes an identifier of each node in the first node set, a frequency offset between timing frequencies of the gateway node and the first-level node, and a frequency offset between timing frequencies of the gateway node and each node in the first node set. The first-level node receives the measurement request, and for the identifier of each node carried in the measurement request, obtains a data transmission parameter between the first-level node and the node corresponding to the identifier of the node. For the obtaining process, refer to the foregoing operations (1) to (5). Details are not described herein again. After obtaining the data transmission parameter between the first-level node and each node, the first-level node sends a measurement response to the gateway node, where the measurement response carries the data transmission parameter between the first-level node and each node. The gateway node receives the measurement response, and reads the data transmission parameter between the first-level node and each node from the measurement response.

When the power distribution grid includes a plurality of first-level power distribution devices, that is, a plurality of first-level nodes is determined in step 203, the gateway node may further determine a child node of each first-level node from the nodes in the power distribution grid.

Any node located after the first-level node in the power distribution grid is referred to as a first node, and when the first node meets the following fifth condition, the first node is a child node of the first-level node. The fifth condition is that a thirteenth data transmission parameter is equal to a difference between a fourteenth data transmission parameter and a fifteenth data transmission parameter, the thirteenth data transmission parameter is a data transmission parameter between the first-level node and the first node, the fourteenth data transmission parameter is a data transmission parameter between the gateway node and the first node, and the fifteenth data transmission parameter is a data transmission parameter between the gateway node and the first-level node.

During implementation, the child node of the first-level node may be determined by performing the following operations 2041 to 2045. The operations 2041 to 2045 are as follows.

2041: The gateway node obtains a data transmission parameter between the first-level node and each node in a third node set, where the third node set includes a node on a power distribution device at each level that is located after the first-level power distribution device.

The gateway node sends a measurement request to the first-level node in the power distribution grid, where the measurement request carries an identifier of each node in the third node set, a frequency offset between timing frequencies of the gateway node and the first-level node, and a frequency offset between timing frequencies of the gateway node and each node in the third node set. The first-level node receives the measurement request, and for the identifier of each node in the third node set carried in the measurement request, obtains a data transmission parameter between the first-level node and the node corresponding to the identifier of the node. For the obtaining process, refer to the foregoing operations (1) to (5). Details are not described herein again. After obtaining the data transmission parameter between the first-level node and each node in the third node set, the first-level node sends a measurement response to the gateway node, where the measurement response carries the data transmission parameter between the first-level node and each node in the third node set. The gateway node receives the measurement response, and reads the data transmission parameter between the first-level node and each node in the third node set from the measurement response.

For example, as shown in FIG. 9, first-level nodes A1 and A2 are determined. In this case, the third node set includes a node on a power distribution device at each level that is located after first-level power distribution devices. To be specific, the third node set includes nodes B1, B2, B3, B4, C1, C2, C3, C4, C5, and C6.

The gateway node obtains a data transmission parameter between the first-level node A1 and each of the nodes B1, B2, B3, B4, C1, C2, C3, C4, C5, and C6.

2042: The gateway node selects a node from the third node set as a second node.

2043: The gateway node determines whether the thirteenth data transmission parameter between the first-level node and the second node, the fourteenth data transmission parameter between the gateway node and the first node, and the fifteenth data transmission parameter between the gateway node and the first-level node meet the fifth condition.

2044: If the fifth condition is met, use the first node as the child node of the first-level node, when at least one node that has not been selected exists in the third node set, select, as the first node, a node from the node that has not been selected, and go back to perform 2043.

For example, the gateway node selects the node B1 as the first node. A thirteenth data transmission parameter between the first-level node A1 and the first node B1 is 5, a fourteenth data transmission parameter between the gateway node and the first node B1 is 10, and a fifteenth data transmission parameter between the gateway node and the first-level node A1 is 5. The thirteenth data transmission parameter 5 is equal to a difference between the fourteenth data transmission parameter 10 and the fifteenth data transmission parameter 5. Therefore, the first node B1 is a child node of the first-level node A1.

The gateway node selects, as the second node, the node B2 from the nodes B2, B3, B4, C1, C2, C3, C4, C5, and C6 that have not been selected in the third node set. The foregoing process is repeated to determine that the second node B2 is also a child node of the first-level node A1.

The gateway node selects, as the first node, the node B3 from the nodes B3, B4, C1, C2, C3, C4, C5, and C6 that have not been selected in the third node set. A thirteenth data transmission parameter between the first-level node A1 and the first node B3 is 15, a fourteenth data transmission parameter between the gateway node and the first node B3 is 10, and a fifteenth data transmission parameter between the gateway node and the first-level node A1 is 5. The thirteenth data transmission parameter 15 is not equal to a difference between the fourteenth data transmission parameter 10 and the fifteenth data transmission parameter 5, that is, the fifth condition is not met. Therefore, the first node B3 is not a child node of the first-level node A1.

2045: If the fifth condition is not met, when at least one node that has not been selected exists in the third node set, select, as the first node, a node from the node that has not been selected, and go back to perform 2043.

If all the nodes in the third node set are selected, the process ends.

For example, when the nodes B4, C1, C2, C3, C4, C5, and C6 have not been selected in the third node set, the gateway node continues to repeat the foregoing process until all the nodes in the third node set are selected. In addition, it is determined that child nodes of the first-level node A1 include the nodes B1, B2, C1, C2, C3, and C4.

For a first-level node A2, the gateway node also repeats the foregoing process to determine that child nodes of the first-level node A2 include the nodes B3, B4, C5, and C6.

In the operation 2041, the gateway node obtains the data transmission parameter between the first-level node and each node in the third node set. Therefore, when child nodes including the first-level node are determined, that is, after the first node set of the first-level node is determined, the data transmission parameter between the first-level node and each node in the first node set already exists.

In step 205, the gateway node determines the second-level node directly connected to the first-level node from the first node set based on the data transmission parameter between the first-level node and each node in the first node set.

Further, when a second target node that meets a first condition does not exist between the first-level node and a first target node, the first target node is determined as the second-level node directly connected to the first-level node. The first target node is any node in the first node set, and the second target node is a node in the first node set other than the first target node. The first condition is that a first data transmission parameter is equal to a value obtained by adding a second data transmission parameter and a third data transmission parameter, the first data transmission parameter is a data transmission parameter between the first-level node and the first target node, the second data transmission parameter is a data transmission parameter between the first-level node and the second target node, and the third data transmission parameter is a data transmission parameter between the second target node and the first target node.

Step 205 may be implemented by performing the following operations 2051 to 2056, and the operations 2051 to 2056 are as follows.

2051: The gateway node selects a node from the first node set as the first target node, and selects another node from the first node set as the second target node.

For example, as shown in FIG. 9, a first node set including child nodes of the first-level node A1 includes nodes B1, B2, C1, C2, C3, and C4. The node B1 is selected from the first node set as the first target node, and the node B2 is selected from the first node set as the second target node.

2052: The gateway node obtains the third data transmission parameter between the first target node and the second target node.

In this step, the gateway node may send a measurement request to the first target node in the power distribution grid, where the measurement request includes an identifier of the second target node, a frequency offset between timing frequencies of the gateway node and the first target node, and a frequency offset between timing frequencies of the gateway node and the second target node. The first target node receives the measurement request, and obtains the third data transmission parameter between the first target node and the second target node. For the obtaining process, refer to the foregoing operations (1) to (5). Details are not described herein again. The first target node sends a measurement response to the gateway node, where the measurement response carries the third data transmission parameter. The gateway node receives the measurement response, and extracts the third data transmission parameter between the first target node and the second target node from the measurement response.

2053: The gateway node determines whether the first data transmission parameter between the first-level node and the first target node, the second data transmission parameter between the first-level node and the second target node, and the third data transmission parameter between the second target node and the first target node meet the first condition. If the first data transmission parameter between the first-level node and the first target node, the second data transmission parameter between the first-level node and the second target node, and the third data transmission parameter between the second target node and the first target node do not meet the first condition, that is, the second target node does not meet the first condition, the gateway node performs 2054. If the first data transmission parameter between the first-level node and the first target node, the second data transmission parameter between the first-level node and the second target node, and the third data transmission parameter between the second target node and the first target node meet the first condition, that is, the second target node meets the first condition, the gateway node performs 2056.

The first data transmission parameter is the data transmission parameter between the first-level node and the first target node that is obtained in step 204, and the second data transmission parameter is the data transmission parameter between the first-level node and the second target node that is obtained in step 204.

An obtained data transmission parameter between the first-level node A1 and the first target node B1 is 5, an obtained data transmission parameter between the first-level node A1 and the second target node B2 is 8, and an obtained data transmission parameter between the first target node B1 and the second target node B2 is 13. The gateway node determines that the first data transmission parameter 5 is not equal to a value obtained by adding the second data transmission parameter 8 and the third data transmission parameter 13, that is, the second target node B2 does not meet the first condition. In this case, the gateway node performs the following operation 2054.

2054: The gateway node determines whether at least one node that has not been selected as the second target node exists in the first node set other than the first target node. If the node exists, the gateway node selects, as the second target node, a node from the node that has not been selected as the second target node, and goes back to perform 2052. If the node does not exist, the gateway node performs 2055.

For example, nodes that have not been selected as the second target node in the first node set other than the first target node B1 include nodes C1, C2, C3, and C4, and the node C1 is selected from the nodes C1, C2, C3, and C4 as the second target node. The gateway node goes back to start from 2052, and determines that the second target node C1 does not meet the first condition. The foregoing process is repeated to finally determine that none of the nodes C2, C3, and C4 meet the first condition, and then 2055 is performed.

2055: The gateway node uses the first target node as a second-level node directly connected to the first-level node, and performs 2056.

For example, the gateway node uses the first target node B1 as a second-level node directly connected to the first-level node A1, and performs 2056.

2056: The gateway node determines whether at least one node that has not been selected as the first target node exists in the first node set. If the node exists, the gateway node selects, as the first target node, a node from the node that has not been selected as the first target node, selects a node from at least one node in the first node set other than the first target node as the second target node, and goes back to perform 2052. If the node does not exist, the process ends.

For example, as shown in FIG. 9, nodes that have not been selected as the first target node in the first node set include nodes B2, C1, C2, C3, and C4. The gateway node selects the node B2 from the nodes B2, C1, C2, C3, and C4 as the first target node, selects the node C1 from the nodes in the first node set other than the first target node B2 as the second target node, and goes back to perform 2052. The foregoing operations 2052 to 2056 are repeatedly performed to finally determine that second-level nodes connected to the first-level node A1 are the nodes B1 and B2.

Refer to FIG. 9. For the first-level node A2, processing is performed according to the foregoing operations performed on the first-level node A1, to obtain second-level nodes B3 and B4 that are directly connected to the first-level node A2.

In step 206, the gateway node generates the physical network topology, where the physical network topology includes the connection relationship between the first-level power distribution device on which the first-level node is located and the second-level power distribution device on which the second-level node is located.

Further, the gateway node obtains, from the node list based on an identifier of the first-level node, basic information of the power distribution device on which the first-level node is located, and obtains, from the node list based on an identifier of the second-level node, basic information of the power distribution device on which the second-level node is located. The gateway node generates a first-level icon and a second-level icon based on the basic information of the power distribution device on which the first-level node is located and the basic information of the power distribution device on which the second-level node is located. The first-level icon is used to indicate the power distribution device on which the first-level node is located, and the basic information of the power distribution device on which the first-level node is located may be stored in the first-level icon. The second-level icon is used to indicate the power distribution device on which the second-level node is located, and the basic information of the power distribution device on which the second-level node is located may be stored in the second-level icon. There is a connection line between the first-level icon and the second-level icon, and the connection line indicates the connection relationship between the first-level power distribution device on which the first-level node is located and the second-level power distribution device on which the second-level node is located.

Optionally, a length of the connection line may be determined based on a signal transmission parameter between the first-level node and the second-level node.

Optionally, when there is a plurality of first-level power distribution devices in the power distribution grid, an icon corresponding to a transformer may be further generated in the physical network topology, and a connection line between the icon corresponding to the transformer and a first-level icon corresponding to each first-level power distribution device may be generated.

Figure 13:
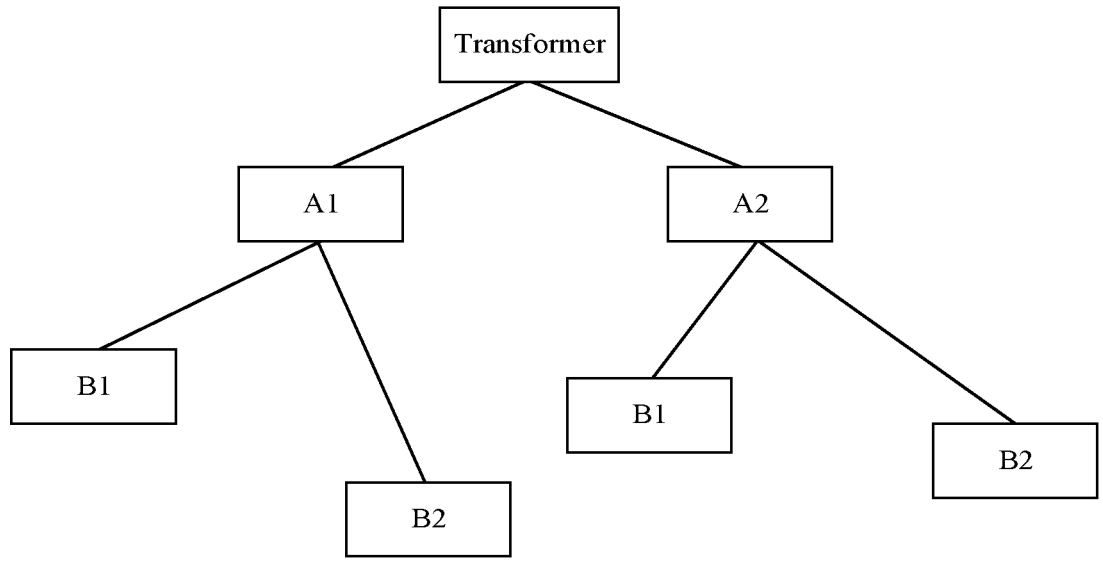
FIG. 13 shows a physical network topology according to an embodiment of this application.

For example, as shown in FIG. 13, the icon corresponding to the transformer is generated in the physical network topology, a first-level icon A1 corresponding to a first-level power distribution device on which the first-level node A1 is located and a first-level icon A2 corresponding to a first-level power distribution device on which the first-level node A2 is located are generated, a connection line is generated between the icon corresponding to the transformer and the first-level icon A1, and a connection line is generated between the icon corresponding to the transformer and the second-level icon A2.

The following icons are generated: a second-level icon B1 corresponding to a second-level power distribution device on which the second-level node B1 is located, a second-level icon B2 corresponding to a second-level power distribution device on which the second-level node B2 is located, a second-level icon B3 corresponding to a second-level power distribution device on which the second-level node B3 is located, and a second-level icon B4 corresponding to a second-level power distribution device on which the second-level node B4 is located. The following connection lines are generated: a connection line between the first-level icon A1 and the second-level icon B1, a connection line between the first-level icon A1 and the second-level icon B2, a connection line between the first-level icon A2 and the second-level icon B3, and a connection line between the first-level icon A2 and the second-level icon B4.

In step 207, the gateway node obtains the data transmission parameter between the $i^{th}$-level node in the first node set and the parent node of the $i^{th}$-level node, the data transmission parameter between the $i^{th}$-level node and each node in the second node set, and the data transmission parameter between the parent node and each node in the second node set, where i=2, 3, . . . , and the second node set includes the node located on the power distribution device at each level that is located after the $i^{th}$-level power distribution device.

The second node set is a subset of the first node set.

The gateway node may send a measurement request to each determined $i^{th}$-level node, where the measurement request carries an identifier of each node in the second node set, a frequency offset between timing frequencies of the gateway node and the $i^{th}$-level node, and a frequency offset between timing frequencies of the gateway node and each node in the second node set. The $i^{th}$-level node receives the measurement request, selects a node from nodes corresponding to identifiers of all nodes in the second node set, and obtains a data transmission parameter between the $i^{th}$-level node and the node. For a detailed process of obtaining the data transmission parameter, refer to the foregoing operations (1) to (5). Details are not described herein again. After obtaining a data transmission parameter between the $i^{th}$-level node and each node in the second node set, the $i^{th}$-level node sends a measurement response to the gateway node, where the measurement response carries the data transmission parameter between the $i^{th}$-level node and each node in the second node set.

When determining a level to which the parent node of the $i^{th}$-level node belongs, the gateway node has obtained and stored the data transmission parameter between the parent node and the $i^{th}$-level node, and the data transmission parameter between the parent node and each node in the second node set. Therefore, in this step, the gateway node may obtain the stored data transmission parameter between the parent node and the $i^{th}$-level node, and the stored data transmission parameter between the parent node and each node in the second node set.

For example, as shown in FIG. 9, for the determined second-level node B1, the second node set includes a node located on a power distribution device at each level that is located after the second-level power distribution device, and the second node set is a subset of the first node set. To be specific, the second node set includes nodes C1, C2, C3, and C4. The gateway node sends a measurement request to the second-level node B1, where the measurement request carries an identifier of the node C1, an identifier of the node C2, an identifier of the node C3, and an identifier of the node C4, a frequency offset between timing frequencies of the gateway node and the second-level node B1, and a frequency offset between timing frequencies of the gateway node and each node in the second node set. The second-level node B1 receives the measurement request, and respectively obtains a data transmission parameter 5 between the second-level node B1 and the node C1, a data transmission parameter 7 between the second-level node B1 and the node C2, a data transmission parameter 18 between the second-level node B1 and the node C3, and a data transmission parameter 21 between the second-level node B1 and the node C4 based on the identifier of the C1 node, the identifier of the C2 node, the identifier of the C3 node, and the identifier of the C4 node in the measurement request, and sends a measurement response to the gateway node, where the measurement response carries the data transmission parameter 5 between the second-level node B1 and the node C1, the data transmission parameter 7 between the second-level node B1 and the node C2, the data transmission parameter 18 between the second-level node B1 and the node C3, and the data transmission parameter 21 between the second-level node B1 and the node C4.

A parent node of the second-level node B2 is the first-level node A1. When determining the first-level node A1, the gateway node has obtained a data transmission parameter 10 between the first-level node A1 and the node C1, a data transmission parameter 12 between the first-level node A1 and the node C2, a data transmission parameter 13 between the first-level node A1 and the node C3, and a data transmission parameter 18 between the first-level node A1 and the node C4.

In step 208, the gateway node selects the first node that meets the third condition from the second node set, to obtain the child node of the $i^{th}$-level node.

The third condition is that a seventh data transmission parameter is equal to a difference between an eighth data transmission parameter and a ninth data transmission parameter, the seventh data transmission parameter is a data transmission parameter between the first node and the $i^{th}$-level node, the eighth data transmission parameter is a data transmission parameter between the first node and the parent node, and the ninth data transmission parameter is a data transmission parameter between the $i^{th}$-level node and the parent node.

During implementation, the child node of the $i^{th}$-level node may be determined by performing the following operations 2081 to 2085. The operations 2081 to 2085 are as follows.

2081: The gateway node selects a node from the second node set as the first node.

2082: The gateway node determines whether the seventh data transmission parameter between the $i^{th}$-level node and the first node, the eighth data transmission parameter between the parent node and the first node, and the sixth data transmission parameter between the parent node and the $i^{th}$-level node meet the third condition.

2083: If the third condition is met, use the first node as the child node of the $i^{th}$-level node, when at least one node that has not been selected exists in the second node set, select, as the first node, a node from the node that has not been selected, and go back to perform 2082.

For example, the gateway node selects the node C1 as the first node. A seventh data transmission parameter between the second-level node B1 and the first node C1 is 5, an eighth data transmission parameter between the first-level node A1 and the first node C1 is 10, and a ninth data transmission parameter between the second-level node B1 and the first-level node A1 is 5. The seventh data transmission parameter 5 is equal to a difference between the eighth data transmission parameter 10 and the ninth data transmission parameter 5. Therefore, the first node C1 is a child node of the second-level node B1.

Nodes that have not been selected in the second node set include nodes C2, C3, and C4. In this case, the node C2 is selected from the nodes C2, C3, and C4 as the first node. The foregoing process is repeated to determine that the node C2 meets the third condition and is also a child node of the second-level node B1.

Nodes that have not been selected in the second node set include nodes C3 and C4. In this case, the node C3 is selected from the nodes C3 and C4 as the first node. The foregoing process is repeated to determine that the node C3 does not meet the third condition, and then the following operation 2084 is performed.

2084: If the third condition is not met, when at least one node that has not been selected exists in the second node set, select, as the first node, a node from the node that has not been selected, and go back to perform 2082.

If each node in the second node set is selected, the process ends. There may be a plurality of $i^{th}$-level nodes. For another $i^{th}$-level node, the foregoing process of 2081 to 2084 is repeated to determine a child node of the other $i^{th}$-level node.

For example, at least one node that has not been selected in the second node set includes the node C4. In this case, the gateway node selects the node C4 as the first node, continues to repeat the foregoing process, and determines that the node C4 does not meet the third condition. The process ends.

The foregoing process of 2081 to 2084 is repeated for the second-level node B2 to determine that child nodes of the second-level node B2 include the nodes C3 and C4. The foregoing process of 2081 to 2084 is repeated for the second-level node B4 to determine that child nodes of the second-level node B4 include nodes C5 and C6.

In step 209, when the sixth target node that meets the fourth condition does not exist between the $i^{th}$-level node and the fifth target node, determine the fifth target node as the $(i+1)^{th}$-level node directly connected to the $i^{th}$-level node.

Further, the fifth target node is any child node of the $i^{th}$-level node, and the sixth target node is a node in child nodes of the $i^{th}$-level node other than the fifth target node. The fourth condition is that a tenth data transmission parameter is equal to a value obtained by adding an eleventh data transmission parameter and a twelfth data transmission parameter, the tenth data transmission parameter is a data transmission parameter between the $i^{th}$-level node and the fifth target node, the eleventh data transmission parameter is a data transmission parameter between the $i^{th}$-level node and the sixth target node, and the twelfth data transmission parameter is a data transmission parameter between the sixth target node and the fifth target node.

Step 209 may be implemented by performing the following operations 2091 to 2096, and the operations 2091 to 2096 are as follows.

2091: The gateway node selects a node from the child nodes of the $i^{th}$-level node as the fifth target node, and selects another node from the child nodes of the $i^{th}$-level node as the sixth target node.

For example, as shown in FIG. 9, the node C1 is selected from child nodes C1 and C2 of the second-level node B1 as the fifth target node, and the node C2 is selected from the child nodes C1 and C2 of the second-level node B1 as the sixth target node.

2092: The gateway node obtains the twelfth data transmission parameter between the fifth target node and the sixth target node.

In step 209, the gateway node may send a measurement request to the fifth target node in the power distribution grid, where the measurement request includes an identifier of the sixth target node, a frequency offset between timing frequencies of the gateway node and the fifth target node, and a frequency offset between timing frequencies of the gateway node and the sixth target node. The fifth target node receives the measurement request, and obtains the twelfth data transmission parameter between the fifth target node and the sixth target node based on the identifier of the sixth target node, the frequency offset between the timing frequencies of the gateway node and the fifth target node, and the frequency offset between the timing frequencies of the gateway node and the sixth target node that are carried in the measurement request. For the obtaining process, refer to the foregoing operations (1) to (5). Details are not described herein again. The fifth target node sends a measurement response to the gateway node, where the measurement response carries the twelfth data transmission parameter. The gateway node receives the measurement response, and extracts the twelfth data transmission parameter between the fifth target node and the sixth target node from the measurement response.

2093: The gateway node determines whether the tenth data transmission parameter between the $i^{th}$-level node and the fifth target node, the eleventh data transmission parameter between the $i^{th}$-level node and the sixth target node, and the twelfth data transmission parameter between the fifth target node and the sixth target node meet the fourth condition. If the tenth data transmission parameter between the $i^{th}$-level node and the fifth target node, the eleventh data transmission parameter between the $i^{th}$-level node and the sixth target node, and the twelfth data transmission parameter between the fifth target node and the sixth target node do not meet the fourth condition, that is, the fifth target node does not meet the fourth condition, the gateway node performs 2094. If the tenth data transmission parameter between the $i^{th}$-level node and the fifth target node, the eleventh data transmission parameter between the $i^{th}$-level node and the sixth target node, and the twelfth data transmission parameter between the fifth target node and the sixth target node meet the fourth condition, that is, the fifth target node meets the fourth condition, the gateway node performs 2096.

The tenth data transmission parameter is the data transmission parameter between the $i^{th}$-level node and the fifth target node that is obtained in step 209, and the eleventh data transmission parameter is the data transmission parameter between the $i^{th}$-level node and the sixth target node that is obtained in step 209.

For example, an obtained tenth data transmission parameter between the second-level node B1 and the fifth target node C1 is 5, an obtained eleventh data transmission parameter between the second-level node B1 and the sixth target node C2 is 7, and an obtained twelfth data transmission parameter between the fifth target node C1 and the sixth target node C2 is 12. The gateway node determines that the tenth data transmission parameter 5 is not equal to a value obtained by adding the eleventh data transmission parameter 7 and the twelfth data transmission parameter 12, that is, the sixth target node C2 does not meet the fourth condition. In this case, the gateway node performs the following operation 2094.

2094: The gateway node determines whether at least one node that has not been selected as the sixth target node exists in the child nodes of the $i^{th}$-level node other than the fifth target node. If the node exists, the gateway node selects, as the sixth target node, a node from the node that has not been selected as the sixth target node, and goes back to perform 2092. If the node does not exist, the gateway node performs 2095.

For example, if at least one node that has not been selected as the sixth target node does not exist in the child nodes of the second-level node B1 other than the fifth target node C1, 2095 is performed.

2095: The gateway node uses the fifth target node as the $(i+1)^{th}$-level node directly connected to the $i^{th}$-level node, and performs 2096.

For example, the gateway node uses the fifth target node C1 as a third-level node directly connected to the second-level node B1, and performs 2096.

2096: The gateway node determines whether at least one node that has not been selected as the fifth target node exists in the child nodes of the $i^{th}$-level node. If the node exists, the gateway node selects, as the fifth target node, a node from the node that has not been selected as the fifth target node, selects a node from nodes in the child nodes of the $i^{th}$-level node other than the fifth target node as the sixth target node, and goes back to perform 2092. If the node does not exist, the process ends.

For example, as shown in FIG. 9, at least one node that has not been selected as the fifth target node in the child nodes of the second-level node B1 includes the node C2. The gateway node selects the node C2 as the fifth target node, selects the node C1 from nodes in the child nodes of the second-level node B1 other than the fifth target node C2 as the sixth target node, and goes back to perform 2092. The foregoing operations 2092 to 2096 are repeatedly performed to determine the third-level node C2 connected to the second-level node B1.

Refer to FIG. 9. For the second-level node B2, processing is performed according to the foregoing operations performed on the second-level node B1, to obtain third-level nodes C3 and C4 that are directly connected to the second-level node B2. For the second-level node B4, processing is performed according to the foregoing operations performed on the second-level node B1, to obtain third-level nodes C5 and C6 that are directly connected the second-level node B4.

In step 210, the gateway node generates, in the physical network topology, the connection relationship between the $i^{th}$-level power distribution device on which the $i^{th}$-level node is located and the $(i+1)^{th}$-level power distribution device on which the $(i+1)^{th}$-level node is located.

Further, the gateway node obtains, from the node list based on an identifier of the $i^{th}$-level node, basic information of the power distribution device on which the $i^{th}$-level node is located, and obtains, from the node list based on an identifier of the $(i+1)^{th}$-level node, basic information of the power distribution device on which the $(i+1)^{th}$-level node is located. The gateway node generates an $i^{th}$-level icon and an $(i+1)^{th}$-level icon based on the basic information of the power distribution device on which the $i^{th}$-level node is located and the basic information of the power distribution device on which the $(i+1)^{th}$-level node is located. The $i^{th}$-level icon is used to indicate the $i^{th}$-level power distribution device on which the $i^{th}$-level node is located, and the basic information of the $i^{th}$-level power distribution device may be stored in the $i^{th}$-level icon. The $(i+1)^{th}$-level icon is used to indicate the $(i+1)^{th}$-level power distribution device on which the $(i+1)^{th}$-level node is located, and the basic information of the $(i+1)^{th}$-level power distribution device may be stored in the $(i+1)^{th}$-level icon. There is a connection line between the $i^{th}$-level icon and the $(i+1)^{th}$-level icon, and the connection line indicates the connection relationship between the $i^{th}$-level power distribution device on which the $i^{th}$-level node is located and the $(i+1)^{th}$-level power distribution device on which the $(i+1)^{th}$-level node is located.

Optionally, a length of the connection line may be determined based on a signal transmission parameter between the $i^{th}$-level node and the $(i+1)^{th}$-level node.

Figure 14:
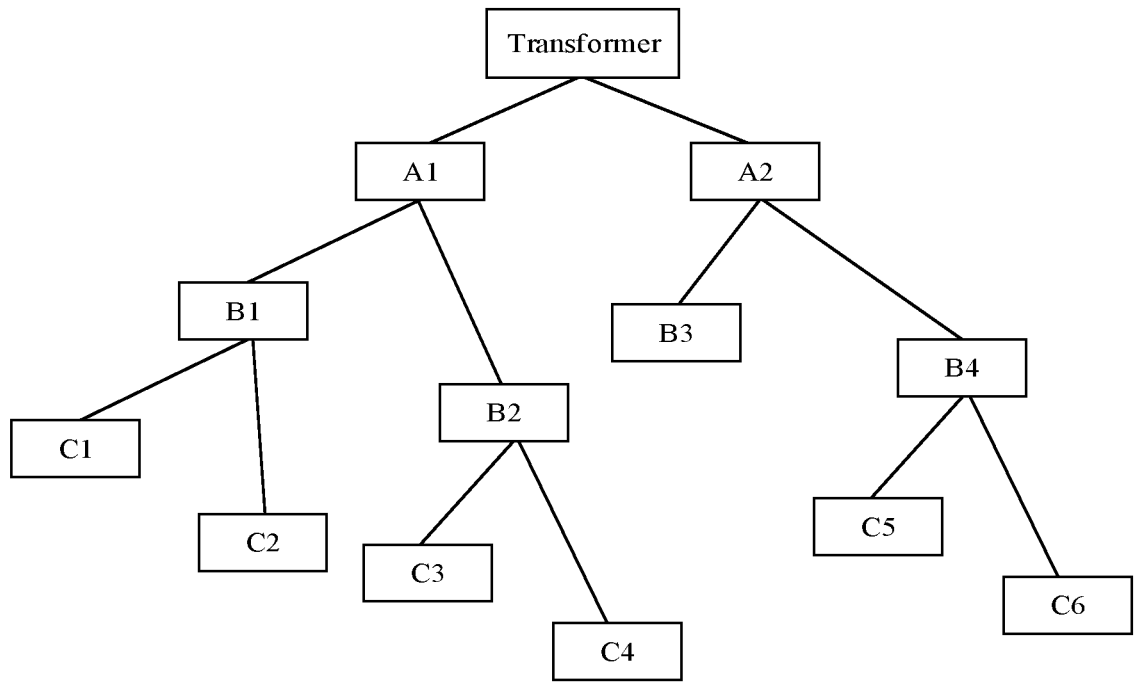
FIG. 14 shows another physical network topology according to an embodiment of this application.

For example, as shown in FIG. 14, the following icons are generated: a third-level icon C1 corresponding to a third-level power distribution device on which the third-level node C1 is located, a third-level icon C2 corresponding to a third-level power distribution device on which the third-level node C2 is located, a third-level icon C3 corresponding to a third-level power distribution device on which the third-level node C3 is located, a third-level icon C4 corresponding to a third-level power distribution device on which the third-level node C4 is located, a third-level icon C5 corresponding to a third-level power distribution device on which the third-level node C5 is located, and a third-level icon C6 corresponding to a third-level power distribution device on which the third-level node C6 is located. The following connection lines are generated: a connection line between the second-level icon B1 and the third-level icon C1, a connection line between the second-level icon B1 and the third-level icon C2, a connection line between the second-level icon B2 and the third-level icon C3, a connection line between the second-level icon B2 and the third-level icon C4, a connection line between the second-level icon B4 and the third-level icon C5, and a connection line between the second-level icon B4 and the third-level icon C6.

The foregoing process of steps 207 to 210 are repeated until power distribution devices at all levels in the power distribution grid and a connection relationship between the power distribution devices at all levels are determined.

A power distribution device includes an input end and a plurality of output ends, and an output end of the $j^{th}$-level power distribution device is connected to an input end of the $(j+1)^{th}$-level power distribution device, where j=1, 2, . . . . However, the generated physical network topology shows a connection relationship between the $j^{th}$-level power distribution device and the $(j+1)^{th}$-level power distribution device, but does not show which output end of the $j^{th}$-level power distribution device is connected to the input end of the $(j+1)^{th}$-level power distribution device. Therefore, which output end of the $j^{th}$-level power distribution device is connected to the input end of the $(j+1)^{th}$-level power distribution device needs to be determined by performing the following operations.

In step 211, the gateway node obtains the electrical signal feature output by the target output end of the $j^{th}$-level power distribution device, and obtains the electrical signal feature of the input end of each $(j+1)^{th}$-level power distribution device connected to the $j^{th}$-level power distribution device, where the target output end is any output end of the $j^{th}$-level power distribution device.

For an any-level power distribution device, for example, for the $j^{th}$-level power distribution device, the gateway node may determine, by performing the following operations 2111 to 2115, the $(j+1)^{th}$-level power distribution device connected to the output end of the $j^{th}$-level power distribution device. The operations 2111 to 2115 may be as follows.

2111: The gateway node selects a $j^{th}$-level power distribution device, selects an output end from output ends included on the $j^{th}$-level power distribution device as a target output end, and determines each $(j+1)^{th}$-level power distribution device connected to the $j^{th}$-level power distribution device.

Optionally, the gateway node obtains, based on the physical network topology, basic information of a $j^{th}$-level power distribution device and basic information of each $(j+1)^{th}$-level power distribution device connected to the $j^{th}$-level power distribution device. The basic information of the $j^{th}$-level power distribution device includes identifiers of all output ends of the $j^{th}$-level power distribution device, and the basic information of the $(j+1)^{th}$-level power distribution device includes an identifier of an input end of the $(j+1)^{th}$-level power distribution device. The gateway node selects an identifier of an output end from the identifiers of all the output ends of the $j^{th}$-level power distribution device as an identifier of the target output end.

2112: The gateway node sends a first energy efficiency measurement request to a $j^{th}$-level node on the $j^{th}$-level power distribution device, where the first energy efficiency measurement request carries the identifier of the target output end, and sends a second energy efficiency measurement request to a $(j+1)^{th}$-level node on the $(j+1)^{th}$-level power distribution device, where the second energy efficiency measurement request carries the identifier of the input end of the $(j+1)^{th}$-level power distribution device.

Optionally, the gateway node may obtain, from the node list based on an identifier of the $j^{th}$-level power distribution device, an identifier of the $j^{th}$-level node located on the $j^{th}$-level power distribution device, and send the first energy efficiency measurement request to the $j^{th}$-level node based on the identifier of the $j^{th}$-level node, where the first energy efficiency measurement request carries the identifier of the target output end. The gateway node obtains, from the node list based on an identifier of the $(j+1)^{th}$-level power distribution device, an identifier of the $(j+1)^{th}$-level node located on the $(j+1)^{th}$-level power distribution device, and sends the second energy efficiency measurement request to the $(j+1)^{th}$-level node based on the identifier of the $(j+1)^{th}$-level node.

Optionally, when one $j^{th}$-level node is disposed at each output end of the $j^{th}$-level power distribution device, the gateway node obtains an identifier of a $j^{th}$-level node located at the target output end from a correspondence between an identifier of a node, an identifier of a port, and an identifier of a power distribution device based on the identifier of the $j^{th}$-level power distribution device and the identifier of the target output end. The gateway node sends, based on the identifier of the $j^{th}$-level node located at the target output end, the first energy efficiency measurement request to the $j^{th}$-level node located at the target output end.

Optionally, when one $(j+1)^{th}$-level node is disposed at the input end of the $(j+1)^{th}$-level power distribution device and one $(j+1)^{th}$-level node is disposed at each output end of the $(j+1)^{th}$-level level power distribution device, the gateway node obtains an identifier of the $(j+1)^{th}$-level node located at the input end of the (j+1)$^{th}$-level power distribution device from the correspondence between an identifier of a node, an identifier of a port, and an identifier of a power distribution device based on the identifier of the (j+1)$^{th}$-level power distribution device and the identifier of the input end of the (j+1)$^{th}$-level power distribution device. The gateway node sends the second energy efficiency measurement request to the (j+1)$^{th}$-level node based on the identifier of the (j+1)$^{th}$-level node.

2113: The j$^{th}$-level node receives the first energy efficiency measurement request, controls, based on the identifier of the target output end included in the first energy efficiency measurement request, an energy efficiency collection terminal located at the target output end to collect an electrical signal feature of the target output end, and sends a first energy efficiency measurement response to the gateway node, where the first energy efficiency measurement response carries the electrical signal feature of the target output end.

The electrical signal feature of the target output end may be a current value or a voltage value output by the target output end. The energy efficiency collection terminal located at the target output end may collect at least one current value or at least one voltage value, use the at least one current value or the at least one voltage value as the electrical signal feature of the target output end, and send the electrical signal feature of the target output end to the j$^{th}$-level node.

Optionally, when the energy efficiency collection terminal collects a plurality of current values or a plurality of voltage values, the electrical signal feature may be a vector constituted by the plurality of current values or a vector constituted by the plurality of voltage values.

The j$^{th}$-level node is connected to the energy efficiency collection terminal through a RS485 interface, and data sent by the energy efficiency collection terminal to the j$^{th}$-level node is in a RS485 format. Therefore, the electrical signal feature of the target output end that is sent by the energy efficiency collection terminal and that is received by the j$^{th}$-level node is data in the RS485 format. The j$^{th}$-level node converts the data format of the electrical signal feature of the target output end into a PLC format, and then sends a first energy efficiency measurement response to the gateway node, where the first energy efficiency measurement response carries the electrical signal feature of the target output end that is in the PLC format.

2114: The (j+1)$^{th}$-level node receives the second energy efficiency measurement request, controls, based on the identifier of the input end of the (j+1)$^{th}$-level power distribution device included in the second energy efficiency measurement request, an energy efficiency collection terminal located at the input end of the (j+1)$^{th}$-level power distribution device to collect an electrical signal feature of the input end, and send a second energy efficiency measurement response to the gateway node, where the second energy efficiency measurement response carries the electrical signal feature of the input end of the (j+1)$^{th}$-level power distribution device.

The electrical signal feature of the input end of the (j+1)$^{th}$-level power distribution device may be a current value or a voltage value input into the input end. The energy efficiency collection terminal located at the input end may collect at least one input current value or at least one input voltage value, use the at least one current value or the at least one voltage value as the electrical signal feature of the input end, and send the electrical signal feature of the input end to the (j+1)$^{th}$-level node.

Optionally, when the energy efficiency collection terminal collects a plurality of input current values or a plurality of input voltage values, the electrical signal feature may be a vector constituted by the plurality of current values or a vector constituted by the plurality of voltage values.

The (j+1)$^{th}$-level node is connected to the energy efficiency collection terminal through a RS485 interface, and data sent by the energy efficiency collection terminal to the (j+1)$^{th}$-level node is in a RS485 format. Therefore, the electrical signal feature of the input end that is sent by the energy efficiency collection terminal and that is received by the (j+1)$^{th}$-level node is data in the RS485 format. The (j+1)$^{th}$-level node converts the data format of the electrical signal feature of the input end into a PLC format, and then sends a second energy efficiency measurement response to the gateway node, where the second energy efficiency measurement response carries the electrical signal feature of the input end that is in the PLC format.

Each of other (j+1)$^{th}$-level nodes sends an electrical signal feature of an input end of a (j+1)$^{th}$-level power distribution device on which the (j+1)$^{th}$-level node is located to the gateway node according to the operation 2114.

2115: The gateway node receives the first energy efficiency measurement response, and extracts the electrical signal feature of the target output end of the j$^{th}$-level power distribution device from the first energy efficiency measurement response, and receives the second energy efficiency measurement response sent by the (j+1)$^{th}$-level node located on the (j+1)$^{th}$-level power distribution device, and extracts the electrical signal feature of the input end of the (j+1)$^{th}$-level power distribution device from the second energy efficiency measurement response.

In step 212, the gateway node determines, based on the electrical signal feature output by the target output end and the electrical signal feature of the input end of each (j+1)$^{th}$-level power distribution device, the (j+1)$^{th}$-level power distribution device connected to the target output end.

Optionally, step 212 may be implemented by performing the following operations 2121 and 2122. The operations 2121 and 2122 are as follows.

2121: The gateway node obtains an electrical signal correlation coefficient between the target output end and the input end of each (j+1)$^{th}$-level power distribution device based on the electrical signal feature of the target output end and the electrical signal feature of the input end of the (j+1)$^{th}$-level power distribution device.

The electrical signal correlation coefficient between the target output end and the input end of each (j+1)$^{th}$-level power distribution device is obtained according to the following fourth formula and based on the electrical signal feature of the target output end and the electrical signal feature of the input end of the (j+1)$^{th}$-level power distribution device.

The fourth formula is:

$$r = \frac{\text{Cov}(X, Y)}{\sqrt{\text{Var}[x] \cdot \text{Var}[Y]}}.$$

In the fourth formula, r represents the electrical signal correlation coefficient between the target output end and the input end of the (j+1)th-level power distribution device, X represents the electrical signal feature of the target output end, and Y represents the electrical signal feature of the input end of the (j+1)th-level power distribution device. Var[x] represents a variance of the electrical signal feature of the target output end, Var [Y] represents a variance of the electrical signal feature of the input end of the (j+1)th-level power distribution device, and Cov(X, Y) represents a covariance between the electrical signal feature of the target output end and the electrical signal feature of the input end of the (j+1)th-level power distribution device.

2122: The gateway node selects a $(j+1)^{th}$-level power distribution device having a largest electrical signal correlation coefficient between the gateway node and the target output end, and determines that an input end of the selected $(j+1)^{th}$-level power distribution device is connected to the target output end of the $j^{th}$-level power distribution device.

In step 213, the gateway node generates, in the physical network topology, the connection relationship between the target output end and the input end of the determined $(j+1)^{th}$-level power distribution device.

Further, the gateway node may draw an image of the target output end in the $j^{th}$-level icon corresponding to the $j^{th}$-level power distribution device, and draw an image of the input end of the determined $(j+1)^{th}$-level power distribution device in a $(j+1)^{th}$-level icon corresponding to the $(j+1)^{th}$-level power distribution device. For a connection line that is in the physical network topology and that connects the $j^{th}$-level power distribution device and the determined $(j+1)^{th}$-level power distribution device, the connection line is set to connect the image of the target output end in the $j^{th}$-level icon and the image of the input end in the $(j+1)^{th}$-level icon.

Figure 15:
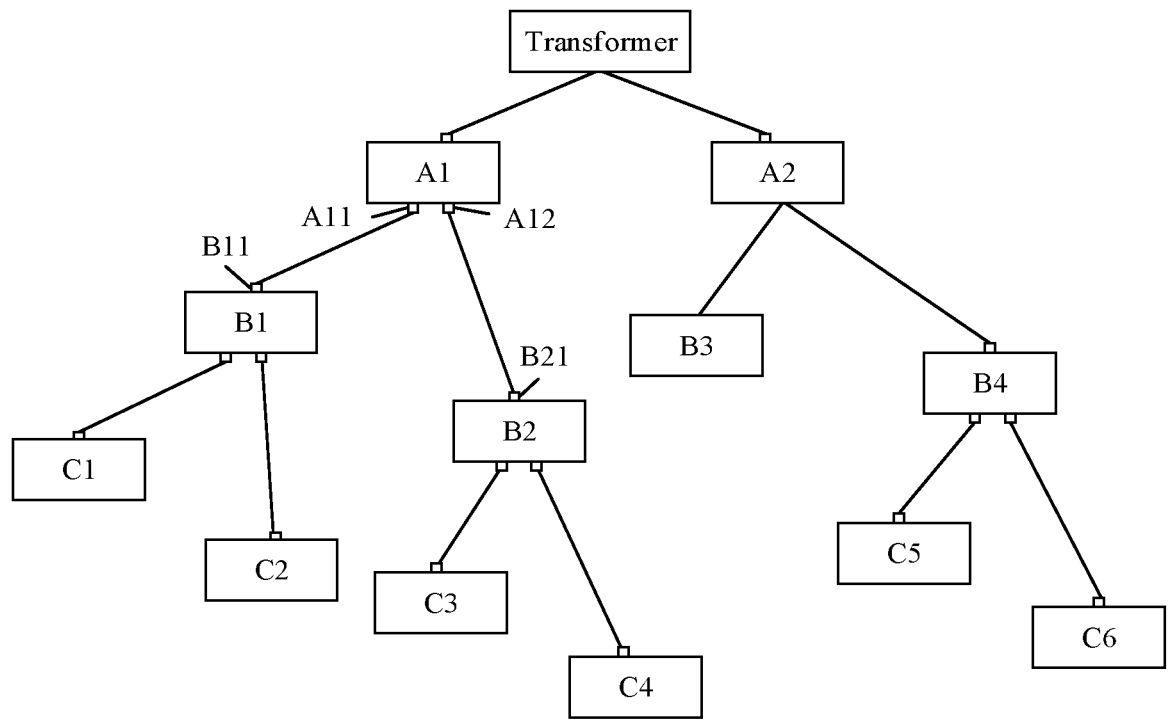
FIG. 15 shows another physical network topology according to an embodiment of this application.

Optionally, the identifier of the target output end may be further displayed in the physical network topology. For example, as shown in FIG. 15, it is assumed that the gateway node determines, by performing the operations in the foregoing steps 211 and 212, that a first output end of a first-level power distribution device A1 is connected to an input end of a second-level power distribution device B1, and a second output end of the first-level power distribution device A1 is connected to an input end of a second-level power distribution device B2. In the physical network topology, the gateway node draws an image A11 of the first output end of the first-level power distribution device A1 and an image A12 of the second output end of the first-level power distribution device A1, and draws an image B11 of the input end of the second-level power distribution device B1 and an image B21 of the input end of the second-level power distribution device B2. For a connection line between the first-level power distribution device A1 and the second-level power distribution device B1, the connection line is set to connect the image A11 of the first output end and the image B11 of the input end. For a connection line between the first-level power distribution device A1 and the second-level power distribution device B2, the connection line is set to connect the image A12 of the second output end and the image B21 of the input end. Refer to FIG. 15. For a power distribution device at another level, an image of an output end and an image of an input end are drawn in a same manner.

The gateway node repeats steps 211 to 213, to determine the $(j+1)^{th}$-level power distribution device connected to each output end of the $j^{th}$-level power distribution device, and generate, in the physical network topology, the connection relationship between the output end of the $j^{th}$-level power distribution device and the input end of the $(j+1)^{th}$-level power distribution device connected to the output end.

Optionally, the gateway node may further send the generated physical network topology of the power distribution grid to the management terminal.

Optionally, when the administrator needs to query basic information of a power distribution device stored on a node in the power distribution grid, the management terminal corresponding to the administrator may send a query instruction to the gateway node through the communications network, where the query instruction includes an identifier of the to-be-queried node. The gateway node receives the query instruction, converts a format of the query instruction into a packet format that can be used for transmission in a PLC network, and sends a converted query instruction to the to-be-queried node. The to-be-queried node receives the query instruction, and returns a query response, where the query response includes the basic information of the power distribution device stored on the to-be-queried node. The gateway node receives the query response, converts a format of the query response into a packet format that can be used for transmission in the communications network, and sends a converted query response to the management terminal through the communications network. The management terminal receives the converted query response.

In this embodiment of this application, the gateway node may obtain the data transmission parameter between the gateway node and each node in the power distribution grid, and determine the first-level node based on the data transmission parameter between the gateway node and each node. The gateway node obtains the data transmission parameter between the first-level node and each node in the first node set, where the first node set includes child nodes of the first-level node, and determines, based on the data transmission parameter between the first-level node and each node in the first node set, the second-level node directly connected to the first-level node, so as to generate the physical network topology. The physical network topology includes the connection relationship between the first-level power distribution device on which the first-level node is located and the second-level power distribution device on which the second-level node is located. The gateway node may obtain the data transmission parameter between the $i^{th}$-level node and each node in the second node set, determine, based on the data transmission parameter between the $i^{th}$-level node and each node in the second node set, the $(i+1)^{th}$-level node directly connected to the $i^{th}$-level node, and generate, in the physical network topology, the connection relationship between the $i^{th}$-level power distribution device on which the $i^{th}$-level node is located and the $(i+1)^{th}$-level power distribution device on which the $(i+1)^{th}$-level node is located. The process of processing the $i^{th}$-level node is repeated until the physical network topology of the entire power distribution grid is obtained. Compared with a manner of manually generating the physical network topology, this can improve efficiency of generating the physical network topology, and avoid a case in which an error may occur in generating the physical network topology because manual input is incorrect. In addition, when a topology of the power distribution grid changes, a latest physical network topology can also be generated in time. The data transmission parameter used for the gateway node to generate the physical network topology is obtained by using a packet, and the packet is sent by using a carrier signal in the power distribution grid. Therefore, a misoperation such as tripping of the power distribution device in the power distribution grid is avoided. This improves security of the power distribution grid. Further, the gateway node may obtain the electrical signal feature output by the target output end of the $j^{th}$-level power distribution device, obtain the electrical signal feature of the input end of each $(j+1)^{th}$-level power distribution device connected to the $j^{th}$-level power distribution device, determine, based on the electrical signal feature output by the target output end and the electrical signal feature of the input end of each $(j+1)^{th}$-level power distribution device, the $(j+1)^{th}$-level power distribution device connected to the target output end, and generate, in the physical network topology, the connection relationship between the target output end and the input end of the determined (j+1)$^{th}$-level power distribution device. In this way, the generated physical network topology not only includes a connection relationship between an any-level power distribution device and an upper-level power distribution device, but also includes a connection relationship between an input end of the any-level power distribution device and an output end of the upper-level power distribution device.

Figure 16:
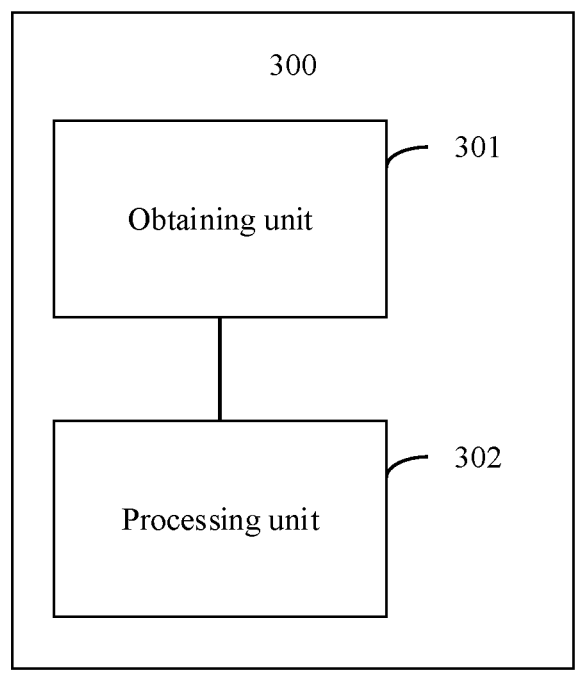
FIG. 16 is a schematic diagram of a structure of an apparatus for generating a physical network topology according to an embodiment of this application.

Refer to FIG. 16. An embodiment of this application provides an apparatus 300 for generating a physical network topology. The apparatus 300 may be deployed in the gateway node in any one of the foregoing embodiments, and includes the following units.

An obtaining unit 301 is configured to obtain a data transmission parameter between a first-level node and each node in a first node set, where the data transmission parameter includes a data transmission distance or a data transmission time, the first-level node is located on a first-level power distribution device in a power distribution grid, the first node set includes a node located on a power distribution device at another level in the power distribution grid other than the first-level power distribution device, and the node in the first node set is a child node of the first-level node.

A processing unit 302 is configured to determine a second-level node directly connected to the first-level node from the first node set based on the data transmission parameter between the first-level node and each node in the first node set.

The processing unit 302 is further configured to generate a physical network topology of the power distribution grid, where the physical network topology includes a connection relationship between the first-level power distribution device on which the first-level node is located and a second-level power distribution device on which the second-level node is located.

Optionally, for a detailed process in which the obtaining unit 301 obtains the data transmission parameter, refer to related content in step 204 in the embodiment shown in FIG. 8A and FIG. 8B. For a detailed process in which the processing unit 302 determines the second-level node and generates the connection relationship between the first-level power distribution device on which the first-level node is located and the second-level power distribution device on which the second-level node is located, refer to related content in steps 205 and 206 in the embodiment shown in FIG. 8A and FIG. 8B.

Optionally, the processing unit 302 is configured to, when a second target node that meets a first condition does not exist between the first-level node and a first target node, determine the first target node as the second-level node directly connected to the first-level node, where the first target node is any node in the first node set, and the second target node is a node in the first node set other than the first target node, and the first condition is that a first data transmission parameter is equal to a value obtained by adding a second data transmission parameter and a third data transmission parameter, the first data transmission parameter is a data transmission parameter between the first-level node and the first target node, the second data transmission parameter is a data transmission parameter between the first-level node and the second target node, and the third data transmission parameter is a data transmission parameter between the second target node and the first target node.

Optionally, the obtaining unit 301 is further configured to obtain a data transmission parameter between the apparatus 300 and a node on each power distribution device in the power distribution grid.

The processing unit 302 is further configured to determine the first-level node based on the data transmission parameter between the apparatus 300 and the node on each power distribution device in the power distribution grid.

Optionally, for a detailed process in which the obtaining unit 301 obtains the data transmission parameter between the apparatus 300 and the node on each power distribution device in the power distribution grid, refer to related content in step 202 in the embodiment shown in FIG. 8A and FIG. 8B. For a detailed process in which the processing unit 302 determines the first-level node, refer to related content in step 203 in the embodiment shown in FIG. 8A and FIG. 8B.

Optionally, the processing unit 302 is configured to, when a fourth target node that meets a second condition does not exist between the apparatus 300 and a third target node, determine the third target node as the first-level node, where the third target node is any node in nodes on all power distribution devices in the power distribution grid, and the fourth target node is a node in the nodes on all the power distribution devices in the power distribution grid other than the third target node, and the second condition is that a fourth data transmission parameter is equal to a value obtained by adding a fifth data transmission parameter and a sixth data transmission parameter, the fourth data transmission parameter is a data transmission parameter between the apparatus 300 and the third target node, the fifth data transmission parameter is a data transmission parameter between the apparatus 300 and the fourth target node, and the sixth data transmission parameter is a data transmission parameter between the fourth target node and the third target node.

Optionally, the power distribution grid includes one first-level power distribution device. The processing unit 302 is configured to select, from nodes on all power distribution devices in the power distribution grid, a node having a smallest data transmission parameter between the node and the apparatus 300 as the first-level node.

The obtaining unit 301 is further configured to obtain a data transmission parameter between an i$^{th}$-level node in the first node set and a parent node of the i$^{th}$-level node, a data transmission parameter between the i$^{th}$-level node and each node in a second node set, and a data transmission parameter between the parent node and each node in the second node set, where i=2, 3, . . . , and the second node set includes a node located on a power distribution device at each level that is located after an i$^{th}$-level power distribution device.

The processing unit 302 is further configured to determine an (i+1)$^{th}$-level node directly connected to the i$^{th}$-level node from the second node set based on the data transmission parameter between the i$^{th}$-level node and the parent node, the data transmission parameter between the i$^{th}$-level node and each node in the second node set, and the data transmission parameter between the parent node and each node in the second node set.

The processing unit 302 is further configured to generate, in the physical network topology, a connection relationship between the i$^{th}$-level power distribution device on which the i$^{th}$-level node is located and an (i+1)$^{th}$-level power distribution device on which the (i+1)$^{th}$-level node is located.

Optionally, for a detailed implementation process in which the obtaining unit 301 obtains the data transmission parameter between the i$^{th}$-level node in the first node set and the parent node of the i$^{th}$-level node, the data transmission parameter between the $i^{th}$-level node and each node in the second node set, and the data transmission parameter between the parent node and each node in the second node set, refer to related content in step 207 in the embodiment shown in FIG. 8A and FIG. 8B. For a detailed implementation process in which the processing unit 302 determines the $(i+1)^{th}$-level node directly connected to the $i^{th}$-level node, and generates the connection relationship between the $i^{th}$-level power distribution device on which the $i^{th}$-level node is located and the $(i+1)^{th}$-level power distribution device on which the $(i+1)^{th}$-level node is located, refer to related content in steps 208 to 210 in the embodiment shown in FIG. 8A and FIG. 8B.

Optionally, the processing unit 302 is configured to select a first node that meets a third condition from the second node set, to obtain a child node of the $i^{th}$-level node, where the third condition is that a seventh data transmission parameter is equal to a difference between an eighth data transmission parameter and a ninth data transmission parameter, the seventh data transmission parameter is a data transmission parameter between the first node and the $i^{th}$-level node, the eighth data transmission parameter is a data transmission parameter between the first node and the parent node, and the ninth data transmission parameter is a data transmission parameter between the $i^{th}$-level node and the parent node, and when a sixth target node that meets a fourth condition does not exist between the $i^{th}$-level node and a fifth target node, determine the fifth target node as the $(i+1)^{th}$-level node directly connected to the $i^{th}$-level node, where the fifth target node is any child node of the $i^{th}$-level node, and the sixth target node is a node in child nodes of the $i^{th}$-level node other than the fifth target node, and the fourth condition is that a tenth data transmission parameter is equal to a value obtained by adding an eleventh data transmission parameter and a twelfth data transmission parameter, the tenth data transmission parameter is a data transmission parameter between the $i^{th}$-level node and the fifth target node, the eleventh data transmission parameter is a data transmission parameter between the $i^{th}$-level node and the sixth target node, and the twelfth data transmission parameter is a data transmission parameter between the sixth target node and the fifth target node.

Optionally, the obtaining unit 301 is further configured to obtain an electrical signal feature output by a target output end of a $j^{th}$-level power distribution device, and obtain an electrical signal feature of an input end of each $(j+1)^{th}$-level power distribution device connected to the $j^{th}$-level power distribution device, where j=1, 2, . . . , and the target output end is any output end of the $j^{th}$-level power distribution device.

The processing unit 302 is further configured to determine, based on the electrical signal feature output by the target output end and the electrical signal feature of the input end of each $(j+1)^{th}$-level power distribution device, a $(j+1)^{th}$-level power distribution device connected to the target output end.

The processing unit 302 is further configured to generate, in the physical network topology, a connection relationship between the target output end and an input end of the determined $(j+1)^{th}$-level power distribution device.

Optionally, for a detailed implementation process in which the obtaining unit 301 obtains the electrical signal feature, refer to related content in step 211 in the embodiment shown in FIG. 8A and FIG. 8B. For a detailed implementation process in which the processing unit 302 generates the connection relationship between the target output end and the input end of the determined $(j+1)^{th}$-level power distribution device, refer to related content in steps 212 and 213 in the embodiment shown in FIG. 8A and FIG. 8B.

Optionally, the obtaining unit 301 is configured to obtain an electrical signal correlation coefficient between the target output end and the input end of each $(j+1)^{th}$-level power distribution device based on the electrical signal feature output by the target output end and the electrical signal feature of the input end of the $(j+1)^{th}$-level power distribution device, and the processing unit 302 is configured to select a $(j+1)^{th}$-level power distribution device having a largest electrical signal correlation coefficient between the $(j+1)^{th}$-level power distribution device and the target output end, and determine that an input end of the selected $(j+1)^{th}$-level power distribution device is connected to the target output end.

Optionally, the obtaining unit 301 and the processing unit 302 may be implemented by the processor 31 by invoking the computer-executable instructions in the memory 35 in the embodiment shown in FIG. 6.

In this embodiment of this application, the obtaining unit can obtain the data transmission parameter between the first-level node and each node in the first node set, and therefore the processing unit can determine the second-level node directly connected to the first-level node from the first node set based on the data transmission parameter. In other words, the processing unit can generate the physical network topology by using the data transmission parameter. The data transmission parameter includes the data transmission time or the data transmission distance, and the data transmission parameter may be obtained by using a packet between the first-level node and each node in the first node set. In this way, the apparatus, the first-level node, and the node in the first node set can obtain the data transmission parameter provided that the apparatus, the first-level node, and the node in the first node set have a function of sending and receiving a packet in the power distribution grid. Therefore, a circuit structure used to generate a feature current signal does not need to be separately disposed on each device. This can reduce costs. When the data transmission parameter is to be obtained, a packet only needs to be transmitted in the power distribution grid according to a PLC protocol. Therefore, a misoperation such as tripping of the power distribution device is avoided. This avoids a potential safety risk. Because the physical network topology can be automatically generated, generation efficiency can be improved. In addition, when a physical network topology of the power distribution grid changes, the physical network topology can be updated in time.

Figure 17:
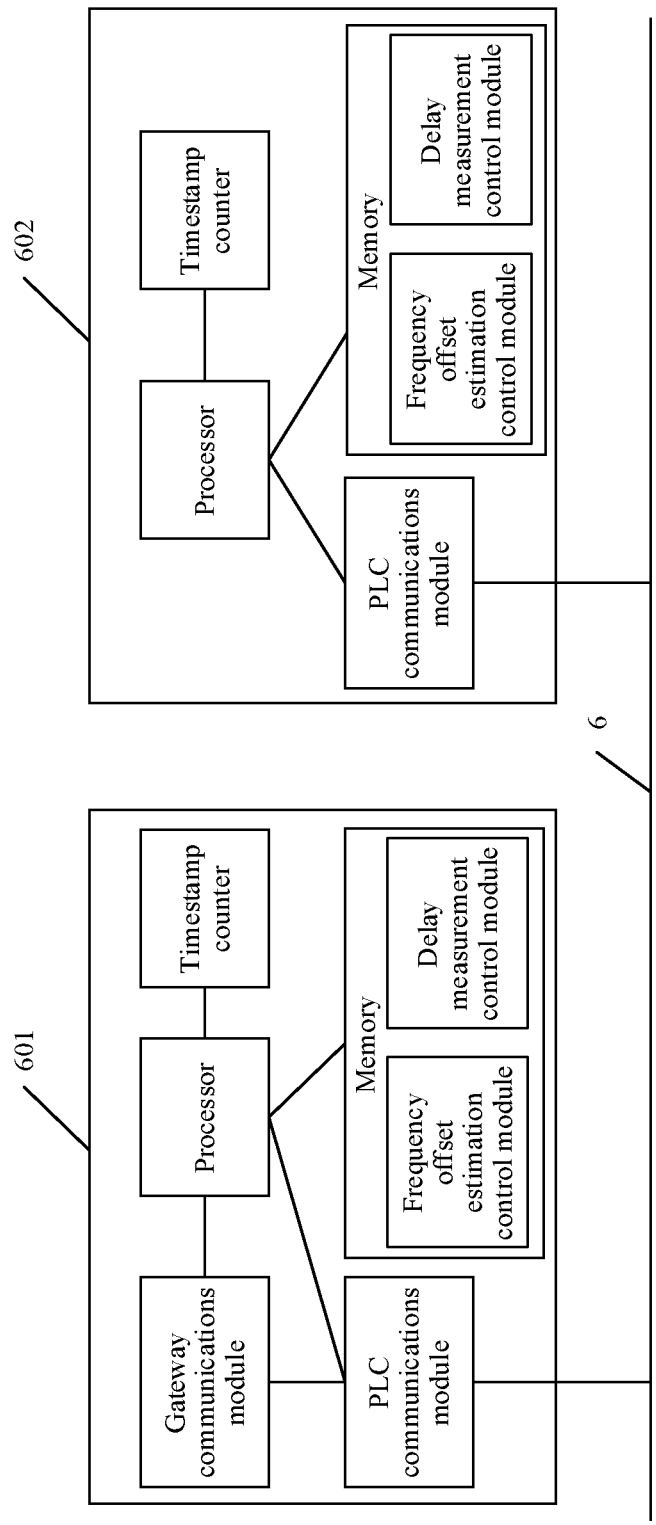
FIG. 17 is a schematic diagram of a structure of a system for generating a physical network topology according to an embodiment of this application.
Figure 18:
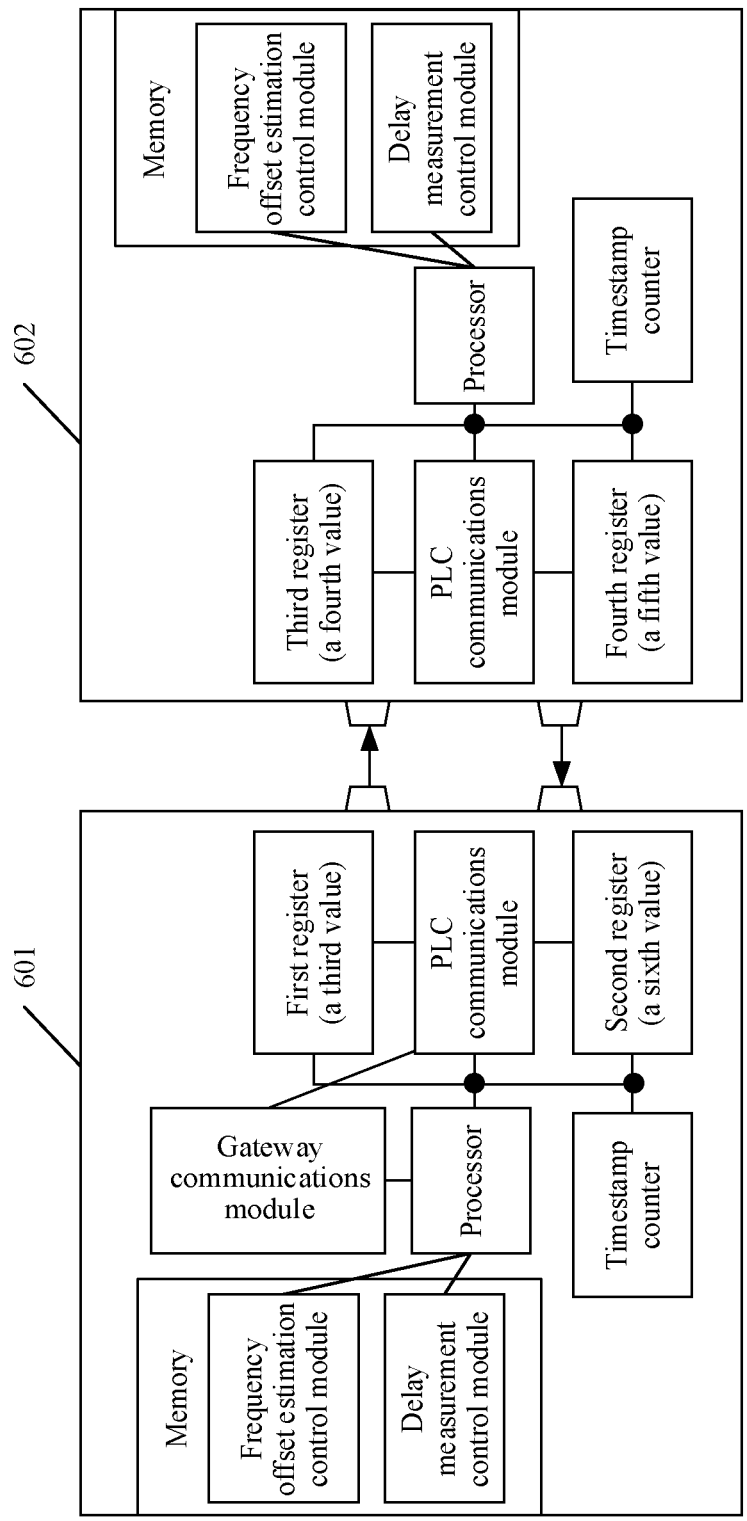
FIG. 18 is a schematic diagram of a structure of another system for generating a physical network topology according to an embodiment of this application.

Refer to FIG. 17 and FIG. 18. An embodiment of this application provides a system for generating a physical network topology. The system includes a gateway node 601 and a node 602 that is located on a power distribution device. A structure of the gateway node 601 may be a structure shown in FIG. 6 (in comparison with FIG. 6, the PLC module, the processor, and the memory are mainly described herein, but the timing frequency generation circuit in FIG. 6 is not described herein, and therefore a timing frequency generation circuit of the gateway node 601 is not shown in FIG. 17 and FIG. 18). A structure of the node 602 that is located on the power distribution device may be a structure shown in FIG. 7 (in comparison with FIG. 7, the PLC module, the processor, and the memory are mainly described herein, but the timing frequency generation circuit in FIG. 6 is not described herein, and therefore a timing frequency generation circuit of the node 602 is not shown in FIG. 17 and FIG. 18). The gateway node 601 is connected to a power line 6 through the PLC module. The node 602 is connected to the power line 6 through the PLC module. The PLC module of the gateway node 601 may send a packet to the node 602 through the power line 6, or receive, from the power line 6, a packet sent by the node 602.

Optionally, as shown in FIG. 17 and FIG. 18, the memory of the gateway node 601 stores a frequency offset estimation control module and a delay measurement control module, and the memory of the node 602 stores a frequency offset estimation control module and a delay measurement control module. The processor of the gateway node 601 may invoke and execute the frequency offset estimation control module to send a frequency offset estimation packet to the node 602 through the PLC module of the gateway node 601, and the processor of the node 602 may invoke and execute the frequency offset estimation control module to receive the frequency offset estimation packet through the PLC module of the node 602, and obtain a frequency offset between timing frequencies of the gateway node 601 and the node 602 based on the frequency offset estimation packet. The processor of the gateway node 601 may invoke and execute the delay measurement control module to obtain a data transmission time between the gateway node 601 and the node 602, and then generate a physical network topology of a power distribution grid based on the data transmission time.

Optionally, as shown in FIG. 18, the gateway node 601 may further include a first register and a second register, and the node 602 may further include a third register and a fourth register. When the gateway node 601 starts to obtain the data transmission time between the gateway node 601 and the node 602, and the gateway node 601 sends a first packet to the node 602 through the PLC module of the gateway node 601, the gateway node 601 reads a third value from a timestamp counter, and stores the third value into the first register. The node 602 receives the first packet, reads a fourth value from a local timestamp counter, and stores the fourth value into the third register, and when determining to send a second packet, reads a fifth value from the local timestamp counter, stores the fifth value into the fourth register, and sends the second packet to the gateway node 601 through the PLC module, where the second packet includes the fourth value stored in the third register and the fifth value stored in the fourth register. The gateway node 601 receives the second packet through the PLC module, reads a sixth value from the local timestamp counter, and stores the sixth value into the second register. Then, the gateway node 601 may obtain the data transmission time between the gateway node 601 and the node 602 based on the obtained frequency offset, the timing frequency of the gateway node 601, the third value stored in the first register, the sixth value stored in the second register, and the fourth value and the fifth value that are included in the second packet.

A person of ordinary skill in the art may understand that all or a part of the steps of the foregoing embodiments may be implemented by hardware or a program instructing related hardware. The program may be stored in a computer-readable storage medium. The storage medium mentioned above may be a read-only memory, a magnetic disk, an optical disc, or the like.

The foregoing description is merely an embodiment of this application, but is not intended to limit this application. Any modification, equivalent replacement, or improvement made without departing from the principle of this application shall fall within the protection scope of this application.

What is claimed is:

1. A method implemented by a gateway node, wherein the method comprises:
   obtaining a first data transmission parameter between a first-level node and each node in a first node set, wherein the first data transmission parameter comprises a data transmission distance or a data transmission time, wherein the first-level node is located on a first-level power distribution device in a power distribution grid, wherein the first node set comprises a first node located on a first power distribution device at another level in the power distribution grid other than the first-level power distribution device, and wherein the first node is a first child node of the first-level node;
   determining, from the first node set and based on the first data transmission parameter, a second-level node directly coupled to the first-level node; and
   generating a physical network topology of the power distribution grid,
   wherein the physical network topology comprises a first connection relationship between the first-level power distribution device and a second-level power distribution device on which the second-level node is located.

2. The method of claim 1, further comprising:
   identifying that a second target node meeting a first condition does not exist between the first-level node and a first target node, wherein the first target node is in the first node set, wherein the second target node is any node in the first node set other than the first target node, wherein the first condition is that a second data transmission parameter between the first-level node and the first target node is equal to a value obtained by adding a third data transmission parameter between the first-level node and the second target node and a fourth data transmission parameter between the second target node and the first target node; and
   setting, in response to identifying that the second target node does not exist between the first-level node and the first target node, the first target node as the second-level node.

3. The method of claim 1, wherein before obtaining the first data transmission parameter, the method further comprises:
   obtaining a second data transmission parameter between the gateway node and each of nodes on power distribution devices in the power distribution grid; and
   determining, based on the second data transmission parameter, the first-level node.

4. The method of claim 3, further comprising:
   identifying that a fourth target node meeting a second condition does not exist between the gateway node and a third target node, wherein the third target node is in the nodes, wherein the fourth target node is any node in the nodes other than the third target node, wherein the second condition is that a third data transmission parameter between the gateway node and the third target node is equal to a value obtained by adding a fifth data transmission parameter between the gateway node and the fourth target node and a sixth data transmission parameter between the fourth target node and the third target node; and
   setting, in response to identifying that the fourth target node does not exist between the gateway node and the third target node, the third target node as the first-level node.

5. The method of claim 3, wherein the power distribution grid comprises one first-level power distribution device, and wherein the method further comprises selecting, from the nodes, a second node having a smallest data transmission parameter between the second node and the gateway node as the first-level node.

6. The method of claim 1, wherein after determining the second-level node, the method further comprises:
   obtaining a second data transmission parameter between an $i^{th}$-level node in the first node set and a parent node of the $i^{th}$-level node, a third data transmission parameter between the $i^{th}$-level node and each node in a second node set, and a fourth data transmission parameter between the parent node and each node in the second node set, wherein i is an integer greater than or equal to 2, and wherein the second node set comprises a third node located on a second power distribution device at each level that is located after an $i^{th}$-level power distribution device;
   determining, from the second node set and based on the second data transmission parameter, the third data transmission parameter and the fourth data transmission parameter, an $(i+1)^{th}$-level node directly coupled to the $i^{th}$-level node; and
   generating, in the physical network topology, a second connection relationship between the $i^{th}$-level power distribution device on which the $i^{th}$-level node is located and an $(i+1)^{th}$-level power distribution device on which the $(i+1)^{th}$-level node is located.

7. The method of claim 6, further comprising:
   selecting, from the second node set, a fourth node meeting a third condition to obtain a second child node of the $i^{th}$-level node, wherein the third condition is that a fifth data transmission parameter between the fourth node and the $i^{th}$-level node is equal to a difference between a sixth data transmission parameter between the fourth node and the parent node and a seventh data transmission parameter between the $i^{th}$-level node and the parent node;
   identifying that a sixth target node meeting a fourth condition does not exist between the $i^{th}$-level node and a fifth target node, wherein the fifth target node is in the $i^{th}$-level node, wherein the sixth target node is any node in child nodes of the $i^{th}$-level node other than the fifth target node, wherein the fourth condition is that an eighth data transmission parameter between the $i^{th}$-level node and the fifth target node is equal to a value obtained by adding a ninth data transmission parameter between the $i^{th}$-level node and the sixth target node and a tenth data transmission parameter between the sixth target node and the fifth target node; and
   determining, in response to identifying that the sixth target node does not exist between the $i^{th}$-level node and the fifth target node, the fifth target node as the $(i+1)^{th}$-level node.

8. The method of claim 1, wherein after generating the physical network topology, the method further comprises:
   obtaining, from a target output end of a $j^{th}$-level power distribution device, a first electrical signal feature, wherein j is an integer greater than or equal to 1, and wherein the target output end is any output end of the $j^{th}$-level power distribution device;
   obtaining a second electrical signal feature of a first input end of each first $(j+1)^{th}$-level power distribution device coupled to the $j^{th}$-level power distribution device;
   determining, based on the first electrical signal feature and the second electrical signal feature, a second $(j+1)^{th}$-level power distribution device coupled to the target output end; and
   generating, in the physical network topology, a third connection relationship between the target output end and a second input end of the second $(j+1)^{th}$-level power distribution device.

9. The method of claim 8, further comprising:
   obtaining, based on the first electrical signal feature and the second electrical signal feature, an electrical signal correlation coefficient between the target output end and the first input end;
   selecting a third $(j+1)^{th}$-level power distribution device having a largest electrical signal correlation coefficient between the gateway node and the target output end; and
   determining that a third input end of the third $(j+1)^{th}$-level power distribution device is coupled to the target output end.

10. An apparatus comprising:
    a memory configured to store instructions; and
    a processor coupled to the memory, wherein, when executed by the processor, the instructions cause the apparatus to:
        obtain a first data transmission parameter between a first-level node and each node in a first node set, wherein the first data transmission parameter comprises a data transmission distance or a data transmission time, wherein the first-level node is located on a first-level power distribution device in a power distribution grid, wherein the first node set comprises a first node located on a first power distribution device at another level in the power distribution grid other than the first-level power distribution device, and wherein the first node is a first child node of the first-level node;
        determine, from the first node set and based on the first data transmission parameter, a second-level node directly coupled to the first-level node; and
        generate a physical network topology of the power distribution grid,
        wherein the physical network topology comprises a first connection relationship between the first-level power distribution device and a second-level power distribution device on which the second-level node is located.

11. The apparatus of claim 10, wherein, when executed by the processor, the instructions further cause the apparatus to:
    identify that a second target node meeting a first condition does not exist between the first-level node and a first target node, wherein the first target node is in the first node set, wherein the second target node is any node in the first node set other than the first target node, wherein the first condition is that a second data transmission parameter between the first-level node and the first target node is equal to a value obtained by adding a third data transmission parameter between the first-level node and the second target node and a fourth data transmission parameter between the second target node and the first target node; and
    set, in response to identifying that the second target node does not exist between the first-level node and the first target node, the first target node as the second-level node.

12. The apparatus of claim 10, wherein, when executed by the processor, the instructions further cause the apparatus to:
    obtain a second data transmission parameter between the apparatus and a node on each power distribution device in the power distribution grid; and determine, based on the second data transmission parameter, the first-level node.

13. The apparatus of claim 12, wherein, when executed by the processor, the instructions further cause the apparatus to:
identify that a fourth target node meeting a second condition does not exist between the apparatus and a third target node, wherein the third target node is in the power distribution devices, wherein the fourth target node is any node in the power distribution devices other than the third target node, wherein the second condition is that a third data transmission parameter between the apparatus and the third target node is equal to a value obtained by adding a fourth data transmission parameter between the apparatus and the fourth target node and a fifth data transmission parameter between the fourth target node and the third target node; and
set, in response to identifying that the fourth target node does not exist between the apparatus and the third target node, the third target node as the first-level node.

14. The apparatus of claim 12, wherein the power distribution grid comprises one first-level power distribution device, and wherein, when executed by the processor, the instructions further cause the apparatus to select, from the nodes, a second node having a smallest data transmission parameter between the second node and the apparatus as the first-level node.

15. The apparatus of claim 10, wherein, when executed by the processor, the instructions further cause the apparatus to:
obtain a second data transmission parameter between an $i^{th}$-level node in the first node set and a parent node of the $i^{th}$-level node, a third data transmission parameter between the $i^{th}$-level node and each node in a second node set, and a fourth data transmission parameter between the parent node and each node in the second node set, wherein i is an integer greater than or equal to 2, and wherein the second node set comprises a third node located on a second power distribution device at each level that is located after an $i^{th}$-level power distribution device;
determine, from the second node set and based on the second data transmission parameter, the third data transmission parameter, and the fourth data transmission parameter, an $(i+1)^{th}$-level node directly coupled to the $i^{th}$-level node; and
generate, in the physical network topology, a second connection relationship between the $i^{th}$-level power distribution device on which the $i^{th}$-level node is located and an $(i+1)^{th}$-level power distribution device on which the $(i+1)^{th}$-level node is located.

16. The apparatus of claim 15, wherein, when executed by the processor, the instructions further cause the apparatus to:
select, from the second node set, a fourth node meeting a third condition to obtain a second child node of the $i^{th}$-level node, wherein the third condition is that a fifth data transmission parameter between the fourth node and the $i^{th}$-level node is equal to a difference between a sixth data transmission parameter between the fourth node and the parent node and a seventh data transmission parameter between the $i^{th}$-level node and the parent node;
identify that a sixth target node meeting a fourth condition does not exist between the $i^{th}$-level node and a fifth target node, wherein the fifth target node is any child node of the $i^{th}$-level node, wherein the sixth target node is in child nodes of the $i^{th}$-level node other than the fifth target node, wherein the fourth condition is that an eighth data transmission parameter between the $i^{th}$-level node and the fifth target node is equal to a value obtained by adding a ninth data transmission parameter between the $i^{th}$-level node and the sixth target node and a tenth data transmission parameter between the sixth target node and the fifth target node; and
determine, in response to identifying that the sixth target node does not exist between the $i^{th}$-level node and the fifth target node, the fifth target node as the $(i+1)^{th}$-level node.

17. The apparatus of claim 10, wherein, when executed by the processor, the instructions further cause the apparatus to:
obtain, from a target output end of a $j^{th}$-level power distribution device, a first electrical signal feature, wherein j is an integer greater than or equal to 1, and wherein the target output end is any output end of the $j^{th}$-level power distribution device;
obtain a second electrical signal feature of a first input end of each first $(j+1)^{th}$-level power distribution device coupled to the $j^{th}$-level power distribution device;
determine, based on the first electrical signal feature and the second electrical signal feature, a second $(j+1)^{th}$-level power distribution device coupled to the target output end; and
generate, in the physical network topology, a third connection relationship between the target output end and a second input end of the second $(j+1)^{th}$-level power distribution device.

18. The apparatus of claim 17, wherein, when executed by the processor, the instructions further cause the apparatus to:
obtain, based on the first electrical signal feature and the second electrical signal feature, an electrical signal correlation coefficient between the target output end and the first input end;
select a third $(j+1)^{th}$-level power distribution device having a largest electrical signal correlation coefficient between the apparatus and the target output end; and
determine that a third input end of the third $(j+1)^{th}$-level power distribution device is coupled to the target output end.

19. A computer program product comprising computer-executable instructions that are stored on a non-transitory computer-readable storage medium and that, when executed by a processor, cause an apparatus to:
obtain a first data transmission parameter between a first-level node and each node in a first node set, wherein the first data transmission parameter comprises a data transmission distance or a data transmission time, wherein the first-level node is located on a first-level power distribution device in a power distribution grid, wherein the first node set comprises a first node located on a first power distribution device at another level in the power distribution grid other than the first-level power distribution device, and wherein the first node is a first child node of the first-level node;
determine, from the first node set and based on the first data transmission parameter, a second-level node directly coupled to the first-level node; and
generate a physical network topology of the power distribution grid,
wherein the physical network topology comprises a first connection relationship between the first-level power distribution device and a second-level power distribution device on which the second-level node is located.

20. The computer program product of claim 19, wherein the computer-executable instructions further cause the apparatus to:

identify that a second target node meeting a first condition does not exist between the first-level node and a first target node, wherein the first target node is in the first node set, wherein the second target node is any node in the first node set other than the first target node, wherein the first condition is that a second data transmission parameter between the first-level node and the first target node is equal to a value obtained by adding a third data transmission parameter between the first-level node and the second target node and a fourth data transmission parameter between the second target node and the first target node; and set, in response to identifying that the second target node does not exist between the first-level node and the first target node, the first target node as the second-level node directly coupled to the first-level node.

\* \* \* \* \*